(12) United States Patent
Constancias

(10) Patent No.: US 11,726,431 B2
(45) Date of Patent: Aug. 15, 2023

(54) DEVICE FOR DETECTING OBJECTS BY HOLOGRAPHY

(71) Applicant: COMMISSARIAT A L'ENERGIE ATOMIQUE ET AUX ENERGIES ALTERNATIVES, Paris (FR)

(72) Inventor: Christophe Constancias, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 334 days.

(21) Appl. No.: 17/132,657

(22) Filed: Dec. 23, 2020

(65) Prior Publication Data
US 2021/0294267 A1 Sep. 23, 2021

(30) Foreign Application Priority Data
Dec. 26, 2019 (FR) ..................... 19 15636

(51) Int. Cl.
*G03H 1/08* (2006.01)
*G01N 15/02* (2006.01)

(52) U.S. Cl.
CPC ....... *G03H 1/0866* (2013.01); *G01N 15/0211* (2013.01); *G01N 2015/0233* (2013.01); *G03H 2001/0883* (2013.01); *G03H 2222/12* (2013.01)

(58) Field of Classification Search
CPC ............... G03H 1/0866; G03H 1/0493; G03H 2001/0883; G03H 2001/0033;

(Continued)

(56) References Cited

U.S. PATENT DOCUMENTS

2017/0082975 A1* 3/2017 Gliere .................... G01N 21/41
2019/0101484 A1* 4/2019 Herve .................. G03H 1/0443

FOREIGN PATENT DOCUMENTS

EP          3 147 646 A1    3/2017
FR          3 049 348 A1    9/2017
WO    WO-2017162985 A1 *   9/2017     ......... G01N 15/1429

OTHER PUBLICATIONS

Junseong Eom, et al., "Three-Dimensional High-Resolution Digital Inline Hologram Reconstruction with a Volumetric Deconvolution Method", Sensors, vol. 18, 2918; doi:10.3390/s18092918, (2818), pp. 1-14.

(Continued)

*Primary Examiner* — Stephone B Allen
*Assistant Examiner* — Jyotsna V Dabbi
(74) *Attorney, Agent, or Firm* — Oblon, McClelland, Maier & Neustadt, L.L.P.

(57) ABSTRACT

A device for detecting at least one object present in a sample, the device including a light source to emit at least one incident wave at a wavelength $\lambda$, a detection volume intended to receive the object, and to receive at least one incident wave, an image sensor positioned to receive at least one scattered light wave obtained by diffraction of the incident wave on the object and a reference wave from the source and not diffracted on the object and to generate a holographic image, and a computer data processing device to digitally reconstruct the object based at least on the holographic image and the wavelength $\lambda$. The device also comprises a support comprising patterns organized to form at least one diffraction grating, the grating being periodic and having a pitch P, such that $\lambda/2 \leq P \leq 2\lambda$.

25 Claims, 30 Drawing Sheets

(58) Field of Classification Search
CPC ......... G03H 2001/005; G03H 2222/12; G03H 2210/55; G03H 2222/13; G03H 2222/15; G03H 2222/23; G01N 15/02; G01N 15/0205; G01N 15/0211; G01N 2015/0233; G01N 2015/025
USPC .......................................................... 359/1
See application file for complete search history.

(56) References Cited

OTHER PUBLICATIONS

Tatiana Latychevskaia, et al., "Practical algorithms for simulation and reconstruction of digital in-line holograms", Applied Optics, vol. 54, No. 9, Mar. 20, 2015, pp. 2424-2434.

\* cited by examiner $$C = \frac{L_{mx} - Lbg}{L_{bg}} = 6.8$$

DEVICE FOR DETECTING OBJECTS BY HOLOGRAPHY

TECHNICAL FIELD

The present invention relates to the field of detection and analysis of objects by holographic imaging. It finds a particularly advantageous application in the field of detection and analysis of small objects such as particles.

The invention can thus be used in the following non-limiting fields: air quality control, detection of microbiological species, detection of powder of explosives as well as alarm systems such as those identifying smoke particles to detect fires.

PRIOR ART

Holographic imaging of an object, based on the recording of a hologram with an image sensor, then the digital reconstruction of the object are commonly used to analyse a sample in order to identify and characterise particles or microscopic objects present in the sample.

As illustrated in FIG. 1, this technique allows to observe a sample by disposing it between a light source 10 and an image sensor 40, without disposing an optical magnifying lens between the sample 20 and the image sensor 40. Thus, the sensor 40 collects an image 41 of the light wave transmitted by the sample. This image, also called a hologram, is formed of interference patterns between a light wave 11, called reference light wave, emitted by source 10 and transmitted by the sample 20, and diffraction waves 13, resulting from diffraction by the sample 20 of the light wave 11 emitted by the source 10. These interference patterns are sometimes called diffraction patterns. If a holographic reconstruction of the sample is performed using a computer system 60, an image 50 of the digitally reconstructed object 50 can be displayed on a screen 62.

Document WO2008090330 describes a device allowing the observation of biological samples, in this case cells, by lensless imaging. The device allows to associate, with each cell, an interference pattern the morphology of which allows to identify the type of cell. Lensless imaging then appears to be a simple and inexpensive alternative to a conventional microscope. In addition, its field of observation is much larger than that of a microscope. It is therefore understandable that the application prospects related to this technology are important.

The document entitled "Practical algorithms for simulation and reconstruction of digital in-line holograms" (Applied Optics, Vol. 54, Issue 9, pp. 2424-2434 (2015) DOI: 10.1364/AO.54.002424) or the document US2012/0218379, describe in particular holographic reconstruction algorithms which, applied to the image formed on the detector, allow to reconstruct the image of the sample in different reconstruction planes.

Thus, holographic imaging allows to observe a sample including particles, on the basis of elementary patterns formed by each particle under the effect of illumination by an incident wave.

However, the known solutions do not have sufficient resolution to identify samples including dispersed particles and of dimensions close to the illumination wavelength. It is then not possible to detect, identify or characterise these small objects.

The known holographic reconstruction solutions also do not allow the morphological identification (for example, external shape and structure) of particles of small dimensions, close to the wavelength or subwavelength.

This problem is illustrated in FIGS. 2A to 2C.

FIG. 2A illustrates a sample 20 including objects such as dark particles 21a, 21b. In this sample, the critical dimensions CD are very much greater than the wavelength $\lambda$ of the radiation emitted by the source. Indeed, a critical dimension CD defined by the distance between the two particles 21a and 21b is such that CD=2 µm ($10^{-6}$ metres), which is much greater than the wavelength $\lambda$=450 nm ($10^{-9}$ metres) of the incident wave 11. In this example, the support 30 has dimensions X and Y along the axes x and y, such that X=Y=50 µm.

This sample 20 is placed near a support 30 having a bright background. A sensor 40, placed at a distance Z1=1.1 cm ($10^{-2}$ metres) from the support 30 carrying the sample 20, collects the waves scattered 13 by the particles 21a, 21b and the waves not scattered 12 by the particles. The recombination of these waves forms on the sensor 40 the interference pattern, that is to say, the hologram 41 shown in FIG. 2B.

It is possible to distinguish on this hologram 41 the particles 21a and 21b. If a holographic reconstruction of the sample is performed by applying one of the reconstruction methods mentioned in the prior art above, the result shown in FIG. 2C is obtained. This image, referred to as a reconstructed object, also allows to identify particles 21a and 21b. It is possible to count the particles. The graph in FIG. 2C which illustrates the light intensity as a function of the position on the axis y identifies the particle 51a and its position. The particle 51b can optionally be detected.

The result is quite different if the critical dimensions of the objects contained in the sample are close to or less than the wavelength of the radiation emitted by the source. This problem is illustrated with FIGS. 3A to 3C.

FIG. 3A illustrates a sample 20 including dark particles 21a-21c. In this sample, the critical dimensions CD are less than the wavelength $\lambda$ of the radiation emitted by the source. In this example, a critical dimension is the distance between the two particles 21a and 21b. Here, this distance is equal to 189 nm. Another critical dimension is the width of the particle 21c. In this example, the wavelength $\lambda$=450 nm ($10^{-9}$ metres). The support 30 has dimensions X and Y along the axes x and y, such that X=Y=1000 µm ($10^{-6}$ metres). The distance Z1 between the support 30 carrying the sample 20 and the sensor 40 is equal to 1 cm.

The hologram 41 formed on the sensor 40 is illustrated in FIG. 2B. It is not possible to distinguish the particles 21a-21c on this hologram 41.

If a holographic reconstruction of the sample is performed, a digitally reconstructed object illustrated in FIG. 3C is obtained. This image does not allow to identify particles 21a-21c. A fortiori, it is impossible to count them and let alone to characterise them. The graph in FIG. 3C which illustrates the light intensity as a function of the position on the axis y also does not allow to identify the particles. In practice, it can be seen that the resolution limit of such a system is $2\lambda$, that is to say, if a critical dimension of the sample 20 is less than or equal to $2\lambda$, then this critical dimension is no longer identifiable.

It can be noted that, if the size of the objects had been much greater, without having critical dimensions, but the distance between two objects was close to or less than the wavelength, these two objects would not appear to be distinct on the hologram or on the reconstructed object.

There is therefore a need to provide a solution to limit, or even eliminate, the drawbacks of known solutions. In particular, there is a need to allow the detection, even counting or identification of objects of small dimensions, that is to say having critical dimensions close to the wavelength or less than the latter.

The other objects, features and advantages of the present invention will become apparent upon examining the following description and the appended drawings. It is understood that other advantages can be incorporated.

SUMMARY

To achieve this purpose, according to one embodiment, provision is made of a device for detecting at least one object, for example present in a sample, the device including:
- a light source configured to emit incident waves at a wavelength $\lambda$,
- a detection volume intended to receive the object, and to receive the incident waves,
- an image sensor, positioned to receive at least scattered light waves obtained by scattering incident waves on the object and a reference wave coming from the source and not scattered on the object and to generate a holographic image based at least on scattered light waves and reference waves,
- a computer data processing device configured, according to one embodiment, to digitally reconstruct the object based at least on the holographic image and the wavelength $\lambda$.

The detection device also comprises a support comprising patterns organised to form at least one diffraction grating. The patterns of at least one grating are organised periodically according to a pitch P, such that $\lambda/2 \leq P \leq 2\lambda$.

The support is configured so that the scattered waves collected by the sensor include either:
- waves from the source which were scattered by the object without being diffracted by the at least one diffraction grating, and also,
- waves from the source which were both diffracted by the at least one diffraction grating and both scattered by the object.

Thus, the detection device is configured so that the sensor collects:
- waves from the source which were both diffracted by the at least one diffraction grating and both scattered by the object, and
- waves from the source which were scattered by the object without being diffracted by the at least one diffraction grating,
- waves from the source which were not scattered by the object.

Thus, the diffraction grating, the period of which is close to the incident wavelength $\lambda$, allows to increase the interaction between light and the object such as a particle. The image sensor collects more light scattered by the object. To the light scattered by the object and transmitted by the grating is added the light scattered by the object and diffracted by the grating.

Thus, the diffraction grating carried by the support acts as a spatial filter which increases the resolution of the reconstruction of the object from the image sensed by the sensor, that is to say from the hologram.

The device according to the invention allows a resolution of critical dimensions of the order of the wavelength $\lambda$, or even less than the wavelength $\lambda$. Typically, the device offers very good resolution for critical dimensions greater than $\lambda/4$.

The proposed device thus allows to:
- distinguish, and therefore for example count, particles separated by a distance of the order of the wavelength $\lambda$ or even less than the wavelength $\lambda$ without risk of considering that it is a question of a single particle of larger size,
- identify particles whose size is of the order of the wavelength $\lambda$, or even less than the wavelength $\lambda$.

The proposed device also allows to carry out a counting and a morphological identification of larger objects, the size of which is typically greater than $10\lambda$. This is, for example, the case of pollens and mould. Furthermore, the present invention allows to remove constraints on the position of the object to be analysed. Indeed, the object to be analysed does not necessarily have to be in contact with the support.

According to a second embodiment, which can be alternative to or combined with the first embodiment wherein the computer data processing device is configured to digitally reconstruct the object, the computer data processing device is configured to perform a count of the objects present in the detection volume. For this purpose, filters are applied to the generated hologram in order to single out the different particles.

Optionally, the device according to the invention can further have at least any one of the following features which can be taken separately or in combination:

According to one example, the computer device is configured to digitally reconstruct the object based at least on the holographic image, the wavelength $\lambda$ and a distance Z1 between the support and the image sensor, the distance Z1 preferably being taken along an axis of propagation z of the incident wave.

According to one example, the device does not include a magnification optics between the support and the image sensor.

According to one example, the grating has a pitch P comprised between $0.75*\lambda$ and $1.5*\lambda$. Preferably, the grating has a pitch P equal to $\lambda$.

The invention finds a particularly advantageous but non-limiting application, in the control of the air quality, the detection of microbiological species, the detection of powder explosives as well as alarm systems such as those identifying smoke particles to detect fires.

The present invention also relates to a system comprising a detection device according to the invention wherein the system is taken from:
- a fire alarm system,
- a fire detection system,
- a system for analysing the quality of a fluid such as air or water,
- an anti-pollution alarm system,
- a system for detecting powder of explosives,
- a system for detecting microbiological species,
- a DNA analysis system,
- a pollen analysis system,
- a mould analysis system.

According to one embodiment, provision is made of a device for detecting at least one object, for example present in a sample, the device including:
- an image sensor, positioned to receive at least scattered light waves obtained by diffraction on the object of incident waves of wavelength $\lambda$ emitted by a source and reference waves coming from the source and not having been diffracted on the object and to generate a holographic image according to at least the scattered light waves and the reference waves.

The device also comprises a support comprising patterns organised in order to form at least one diffraction grating.

The patterns of at least one grating are organised periodically according to a pitch P, such that $\lambda/2 \leq P \leq 2\lambda$.

The detection device is configured so that the sensor collects at least:
- waves from the source which were both diffracted by the at least one diffraction grating and both scattered by the object, and
- waves from the source which were scattered by the object without being diffracted by the at least one diffraction grating,
- waves from the source which were not scattered by the object.

The device may or may not comprise the source.

BRIEF DESCRIPTION OF THE FIGURES

The purposes, objects, as well as the features and advantages of the invention will emerge better from the detailed description of an embodiment of the latter which is illustrated by the following accompanying drawings wherein.

Figure 1:
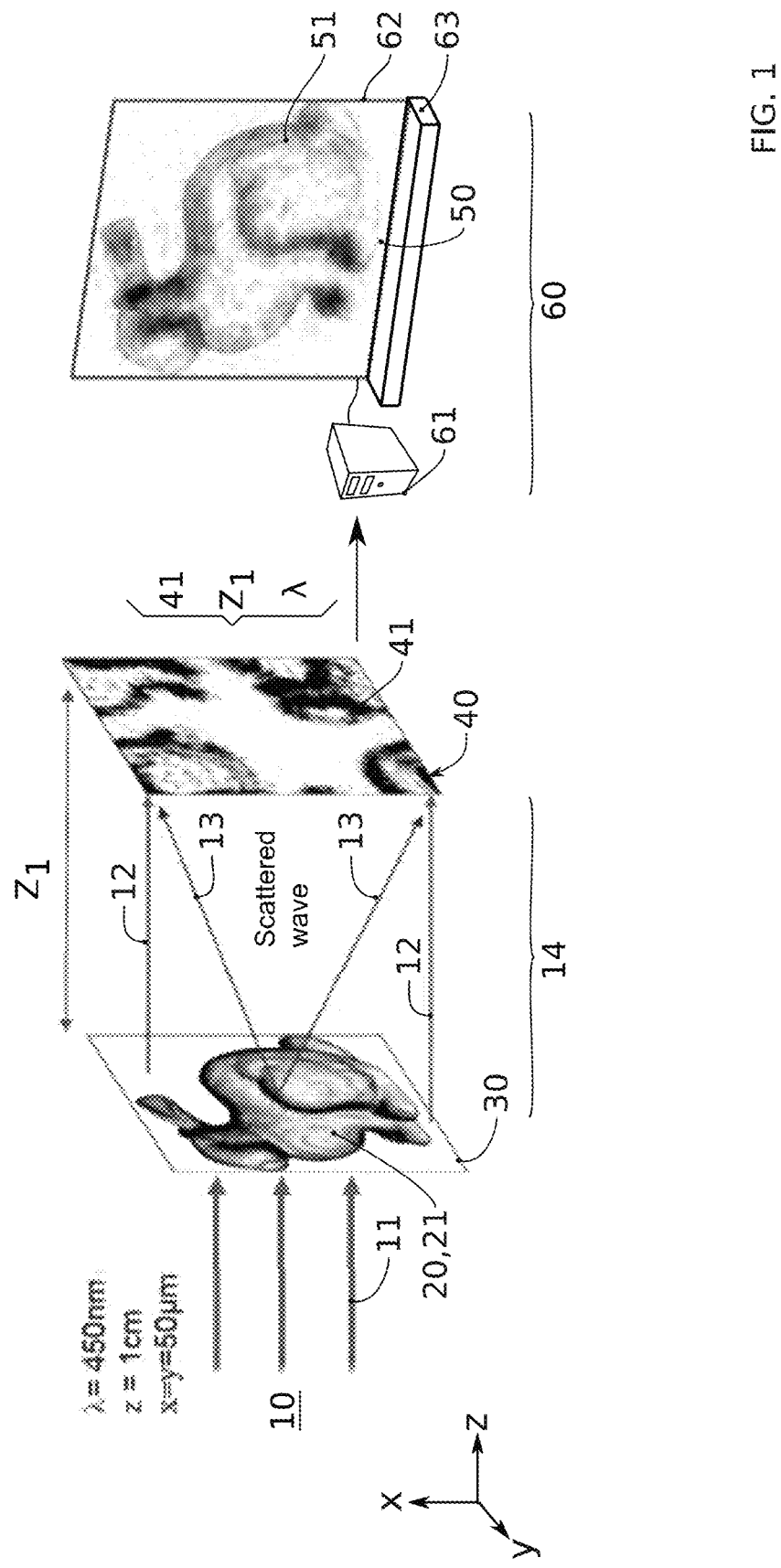
FIG. 1 schematically shows a holographic imaging detection device according to the prior art.

The drawings are given by way of examples and are not limiting of the invention. They constitute schematic principle representations intended to facilitate the understanding of the invention and are not necessarily on the scale of practical applications. In particular, the relative dimensions of the objects to be analysed and of the various patterns of the gratings are not representative of reality.

DETAILED DESCRIPTION

Before starting a detailed review of embodiments of the invention, optional features are listed below which can optionally be used in combination or alternatively:

According to one example, the grating extends in a plane xy perpendicular to the axis of propagation z.

The reference wave corresponds to the incident wave not scattered on the object.

A wave collected by the sensor after having both been diffracted by the at least one diffraction grating and at the same time been scattered by the object means that this same wave has either been first scattered by the object then diffracted by the grating or vice versa that it was first scattered by the grating then diffracted by the object.

According to one example, the support is placed between the detection volume and the image sensor. Thus, waves are scattered by the object and then diffracted by the grating. According to an alternative embodiment, the detection volume is disposed between the support and the image sensor. Thus, waves are diffracted by the grating then are scattered by the object.

According to one example, the grating is a grating of parallel straight lines. Thus, it is a one-dimensional grating. According to one example, the straight lines extend in the plane of the support. This embodiment has the advantage of being particularly simple and inexpensive to produce. Furthermore, when the lines form ribs and trenches, it is possible to dispose the objects desired to be achieved inside the trenches. This allows to control their position with greater precision. Moreover, this allows to maintain their position during handling or transport.

According to another example, the grating is a two-dimensional grating, according to a first dimension of the grating, taken in the plane xy, the grating has a pitch Pa and according to a second dimension of the grating, taken in the plane xy and perpendicular to the first dimension, the grating has a pitch Pb, with Pa and Pb such that $\lambda/2 \leq Pa \leq 2\lambda$ and $\lambda/2 \leq Pb \leq 2\lambda$. According to one example, Pa=Pb, preferably, the two-dimensional grating comprises or is formed of point patterns, the distance between two point patterns corresponding to the pitch P=Pa=Pb of the grating. This embodiment has the advantage that the patterns of the grating occupy a smaller surface area than the patterns of a one-dimensional grating. The support carrying a two-dimensional grating is therefore more transparent than a support carrying a one-dimensional grating. This allows to improve contrast and signal-to-noise ratio.

According to one example, the support comprises patterns organised so as to form at least two periodic diffraction gratings, among which a first grating having a pitch Pa, and a second grating having a pitch Pb, with Pa and Pb such that Pa≠Pb, $\lambda/2 \leq Pa \leq 2\lambda$ and $\lambda/2 \leq Pb \leq 2\lambda$. According to one example, the light source is configured to emit at least a first incident wave and a second incident wave, respectively having a wavelength $\lambda a$ and $\lambda b$, such that $\lambda a/2 \leq Pa \leq 2\lambda a$ and $\lambda b/2 \leq Pb \leq 2\lambda b$, preferably $0.75*\lambda a/2 \leq Pa \leq 1.5*\lambda a$ and $0.75*\lambda b/2 \leq Pb \leq 1.5*\lambda b$ and preferably $\lambda a$=Pa and $\lambda b$=Pb.

According to one embodiment, the first and the second waves are emitted simultaneously by the source. According to another embodiment, the first and second waves are emitted successively by the source. This embodiment allows to obtain several images, each image corresponding to an analysis wavelength. Thus, this allows a chemical analysis according to the molecular absorption of the constituent components of the particles. For example, $\lambda a$ belongs to the infrared domain and $\lambda b$ belongs to the ultraviolet domain.

According to one example, the at least two gratings are located on distinct areas of the support. Thus, the gratings are not interlaced. This embodiment has the advantage of being able to associate with each of the areas of the hologram an image corresponding to a wavelength. Processing is simplified.

Preferably, the gratings are distinct but contiguous. Alternatively, they can be distinct and separated from each other by a space in a plane parallel to a plane xy perpendicular to a main axis of propagation z of the incident wave reaching the support.

According to one example, the at least two gratings are at least partly and preferably entirely interlaced.

Thus, in projection on a plane xy, the gratings are superimposed.

This embodiment allows to reduce the size of the device.

According to one embodiment, the gratings are in contact or are contained in one or more identical planes, parallel to the plane xy. The gratings may also not be in contact. In this case, they do not have a space therebetween capable of allowing particles to pass.

This embodiment allows to produce each of the gratings during the same manufacturing step, for example during the same lithography step. This eliminates the alignment issues that would arise if each area should be subject to a dedicated lithography step. This embodiment thus allows to respond to a problem consisting in improving the precision of the detector while limiting its manufacturing cost.

According to another embodiment, the gratings are superimposed without being in contact. They are then at a distance from each other, a non-zero distance, taken in the direction z, separating them. This is for example the case if a grating is formed by a first face a layer (for example if this face is structured to form this grating) and another grating is formed by a second face, opposite to the first face of this same layer or another grating is formed in the thickness of this layer (for example if this grating is formed by the grating of atoms of this layer).

Thus, according to one embodiment, the two gratings can cover the same area. Alternatively, they may overlap on only part of the areas they respectively overlap.

Preferably, each wave propagates along at least the axis of propagation z.

According to one example, the object has a critical dimension CD less than or equal to $\lambda$.

According to one example, the at least one grating occupies on the support an area having, at the wavelength $\lambda$, a transmission coefficient T such that T≥0.5, preferably T≥0.75 and preferably T≥0.96. This improves the contrast of the image obtained on the sensor as well as the background noise signal.

According to one example, the patterns of the grating are made of a dielectric material.

Alternatively, the patterns of the grating are made of a material having a heat conduction coefficient greater than or equal to 5 $Wm^{-1} \cdot K^{-1}$, the patterns of the grating preferably being made of a metallic material such as tungsten. According to one example, the patterns of the grating form heating elements when power supplied.

Preferably, the patterns are made of metal.

Typically, the patterns of the support can be brought to a temperature of at least 200° C. for the desorption of organic or volatile materials. The temperature can reach 1700° C. or even 2400° C. for refractory metals such as molybdenum or tungsten. The person skilled in the art will be able to use alloys such as molybdenum disilicide MoSi2 or silicon carbide SiC, in particular because of a lower cost.

These embodiments allow the support to be heated. This has the advantage of being able to destroy the particles in contact with the support by heating, thus allowing to clean the latter. This embodiment thus provides a solution to the problem of extending the lifetime and the sensitivity of the detector.

These embodiments also allow to differentiate the nature of the particles. Indeed, heating the grating will allow to degrade some particles, typically organic particles, without degrading other particles, typically metallic particles. By making successive recordings, without, then with heating, it is then possible to discriminate the analysed objects according to their sensitivity to heat.

According to one example, the grating comprises, or is only formed by, at least one crystal lattice, the patterns of the grating being formed, at least in part, by atoms of the crystal lattice.

According to one example, the support comprises a layer having a face structured so as to form a first grating of relief patterns and a second grating formed by said crystal lattice.

According to one example, the source emits the incident wave in a main direction of propagation z, and the support has a main face extending in a plane $P_{30}$ perpendicular to the axis of propagation z.

According to one example, the source emits the incident wave in a main direction of propagation z, and the sensor has a plurality of photodetectors extending in a plane $P_0$ perpendicular to the axis of propagation z.

The source, the support and the image sensor are aligned, preferably in a direction of propagation (z) of the incident wave. Thus, the detector is called "online" detector.

According to an alternative embodiment, the sensor receives, on the one hand, the waves scattered by the support and receives, on the other hand, the reference wave, without the latter passing through the support. For example, a reflection device or an interferometer is provided in order to divide the radiation from the source into a wave arriving at the object and a wave arriving directly, or by reflection, at the sensor without passing through the support. In this case, this is referred to as a transmission hologram, in an "off axis" configuration.

According to one example, the reference waves are incident waves which may or may not have been diffracted by the diffraction grating.

According to one example, the object has a critical dimension CD less than or equal to $\lambda$.

According to another example, the object has a critical dimension CD, such that $CD \geq 2*\lambda$ and preferably $CD \geq 10*\lambda$. According to one embodiment, $CD \geq 10$ μm $10^{-6}$ metres).

According to one example, the image sensor comprises a plurality of photodetectors, typically arranged in the form of a matrix.

According to one example, the object is opaque. It is disposed on a transparent background.

According to one example, the object is movable in the detection volume.

According to one example, the support comprises apertures located between the patterns. Preferably, the apertures separate the patterns. According to one embodiment, the apertures extend from a given pattern and to another pattern, which is adjacent to the given pattern.

According to one example, the support forms a grating, whose mesh is formed by the patterns.

According to one example, the patterns are entirely supported by the frame. According to one embodiment, the frame extends only around the perimeter of the grating.

According to one example, the detection device comprises a plurality of supports disposed in series, spaced from each other along the axis of propagation z and each comprising at least one diffraction grating, so that the at least one object present in the detection volume is located between the gratings of two adjacent supports. The gratings thus channel the objects.

According to one example, the distance between the sample, more particularly the object(s) to be analysed, and the grating is less than Z1. Thus, it is possible to have $Z2 \neq 0$ and more generally $0 < Z2 < Z1$.

According to a non-limiting example, the computer data processing device is configured to obtain the reconstruction of at least one image from a digital hologram generated by the sensor, by performing at least the following steps using a computer device:

1/ defining a propagation matrix in the image plane based on N (number of pixels of the image sensor); $\lambda$; the size of the object (typically the width of the matrix assimilated to the object); the distance Z1 between the support (or the object in contact with the matrix) and the image sensor.

2/ multiplying the digital hologram by the propagation matrix,

3/ obtaining at least one image reconstructed by performing an inverse Fourier transformation on the result of the previous step.

In the context of the present invention, the term "particle" or its equivalents is defined as a constituent of a physical system considered to be elementary relative to the properties studied.

The term "particle" designates in particular a solid, liquid or wet solid object in suspension in the air and whose size is microscopic. For example, a particle is an element of matter whose largest dimension is less than a few millimetres ($10^{-3}$ metres), preferably one millimetre, preferably less than 100 μm, preferably a few tens of micrometres ($10^{-6}$ metres) and preferably less than a micrometre, or even of the order of a nanometre ($10^{-9}$ m). These dimensions can correspond to a diameter of the particle or the diameter of a sphere wherein the particle is inscribed.

More generally, the particles have a size greater than 40 Å ($10^{-10}$ m) and are therefore considered to be optically continuous. In general, these are objects composed of matter whose dimensions are small compared to the dimensions of the cavity or the particle circulation channel.

The term "size" or "diameter" of a particle means the maximum distance between two points of the particle. Typically, a particle is assimilated to an object of spherical size, its size therefore corresponds to the diameter of the sphere.

In the present description, a material is considered to be transparent when it allows at least 50% of light radiation to pass, preferably at least 75%, preferably at least 90% and advantageously at least 95%. A material called transparent material corresponds to this definition at least for the wavelength at which the detector incorporating this material is intended to operate.

In the present description, a material is considered to be opaque when it blocks at least 50% of light radiation, preferably at least 75%, preferably at least 90% and advantageously at least 95%. A material corresponds to this definition at least for the wavelength at which the detector incorporating this material is intended to operate.

In what follows, the term "diffraction", "scattering" or their equivalents refer to the phenomenon by which a propagation medium produces a distribution, in many directions, of the energy of an electromagnetic, light wave for example.

Figure 4:
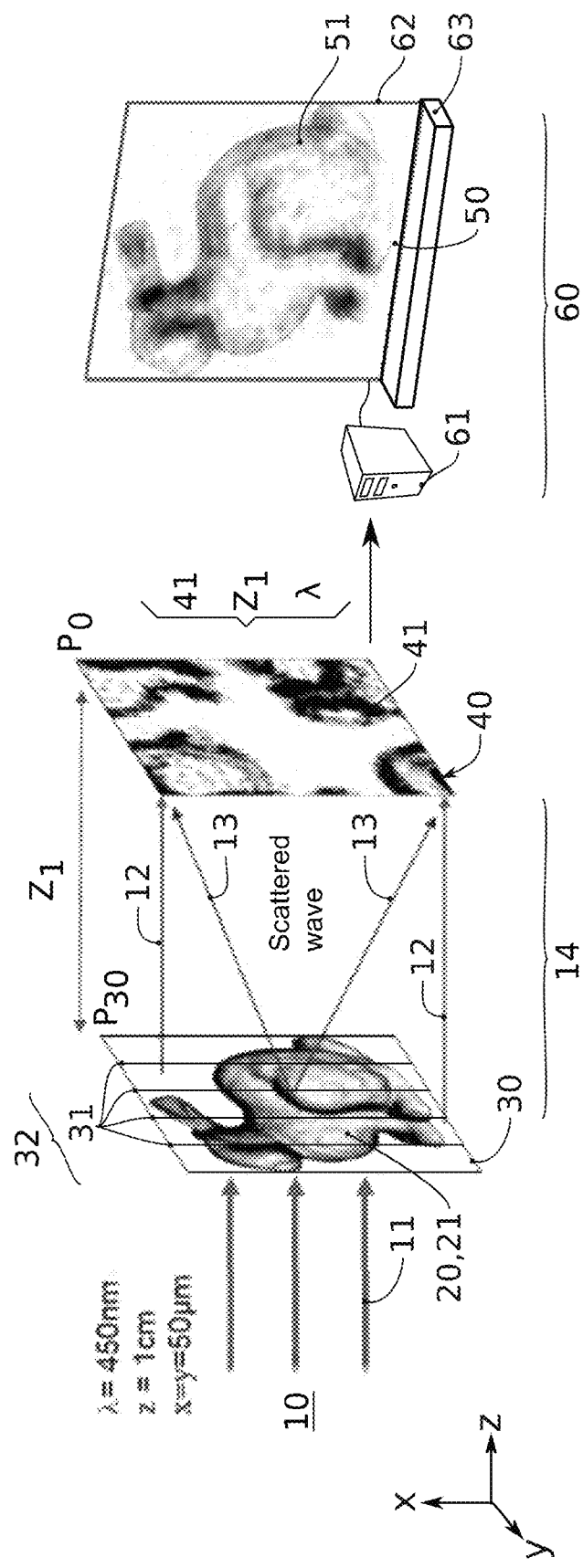
FIG. 4 schematically shows an example of a holographic imaging detection device according to an embodiment of the present invention.

FIG. 4 shows an example of a device according to the invention. A light source 10 is configured to emit at least one light wave 11, called an incident light wave, propagating in the direction of a sample 20. This propagation can be carried out directly on the sample 20, for example by propagating along a main axis of propagation, designated axis of propagation z of the orthogonal reference frame xyz illustrated in FIG. 4. Alternatively, the incident light wave 11 can reach the sample 20 after reflection on optical devices.

The light wave 11 is emitted according to a spectral band $\Delta\lambda$, including a wavelength $\lambda$. This wavelength can be a central wavelength of said spectral band. According to a non-limiting example, $\lambda$ belongs to the infrared or ultraviolet wavelengths.

The sample 20 is a sample that it is desired to be characterised. It may in particular be a medium including one or more objects 21 such as particles. The medium wherein there are the particles may be a gaseous fluid, such as air. This is for example the case if the particles to be detected are polluting particles such as smoke particles etc.

According to another embodiment, the medium can be a liquid wherein the particles bathe. It can, for example, be a body fluid, a culture medium or a liquid taken from the environment or from an industrial process. It can also be a solid medium or having the consistency of a gel. It can also be an evaporated, fixed or frozen sample.

The sample 20 is placed on or near a support 30. The support 30 has at least one face, facing the sample 20 and extending mainly along a plane xy perpendicular to the axis of propagation z of the incident wave 11 upon its arrival on the object 20. According to one embodiment, the sample 20 is held on the support 30. Alternatively, it can be at a distance Z210 from the latter, in particular when the sample 20 comprises particles suspended in a gas stream.

The support 30 has at least one periodic diffraction structure. This periodic structure forms a grating 32 of patterns 31. Preferably, the support 30 has a support, also referred to as a background, which is transparent and the patterns 31 of the grating are opaque. In this case, the patterns 31 are preferably made of a dielectric material or a metallic material such as tungsten.

According to an alternative embodiment, the support 30 has an opaque support or background and the patterns 31 of the grating are transparent. The patterns 31 of the grating 32 are organised periodically according to a pitch P, such that $\lambda/2 \leq P \leq 2*\lambda$, preferably $\lambda/0.75 \leq P \leq 1.5*\lambda$ and preferably $\lambda/0.9 \leq P \leq 1.1*\lambda$. The grating acts as a spatial filter. The features, functions and advantages of the support 30 carrying at least one grating 32 will be detailed below.

The distance between the light source 11 and the sample 10 is preferably greater than 1 cm. It is preferably comprised between 2 and 30 cm. It can be said that it is a plane or spherical wave, which allows to overcome the distance from the source. For the reconstruction from the digital hologram, the description of the source is limited to these two cases.

Preferably, the light source 10, seen by the sample 20, is considered to be a point. This means that its diameter (or its diagonal) is preferably less than a tenth, better still than a hundredth of the distance between the sample 20 and the light source 10. Thus, preferably, the light reaches the sample 20 as plane waves, or which can be considered as such. The light source 10 can be a light emitting diode or a laser diode. It can be associated with a diaphragm, or spatial filter. Alternatively, light can reach the sample 20 as spherical waves.

Preferably, the spectral emission band $\Delta\lambda$ of the incident light wave 11 has a width of less than 100 nm. Spectral bandwidth means a width at half the height of said spectral band. In general, a wave is considered to be quasi-monochromatic if $\Delta\lambda \ll \lambda$ ($\lambda$ usually being designated $\lambda_0$ in this context) with typically $\Delta\lambda \sim \pm 5\%$. Generally, the monochromaticity is defined relative to the frequency of the wave $f_0$ of the optical signal: $\Delta f \ll f_0$.

The sample 20 and the support 30 are disposed between the light source 10 and an image sensor 40. The latter preferably extends parallel, or substantially parallel to the plane along which the sample 20 extends. The term substantially parallel means that the two elements may not be strictly parallel, an angular tolerance of a few degrees, less than 20° or 10° being allowed. In the example illustrated in FIG. 4, these planes correspond to the plane xy of the coordinate system xyz.

The image sensor 40 is able to form an image according to a detection plane $P_0$. The detection plane $P_0$ preferably extends perpendicular to the axis of propagation z of the incident light wave 11, that is to say, it extends parallel to the plane xy. In the example shown, the image sensor 40 may comprise a matrix of photodetectors, each photodetector comprising a pixel, of the CCD or CMOS type. CMOS are the preferred sensors because the size of the pixels is smaller, which allows to acquire images with more favourable spatial resolution.

The distance Z1 between the support 30, more particularly between the grating 32 of the support 30 and the pixel matrix of the image sensor 40 is preferably comprised between 0.01 cm ($10^{-2}$ metres) and 20 cm, and preferably comprised between 0.1 cm and 1 cm. More specifically, Z1 is measured between a front face of the sensor 40 and the rear face of the grating 32. The front face of the sensor 40 faces the rear face of the grating 32.

According to one example, the objects 21 to be analysed, whether they are static or movable in a fluid, are located between the grating 32 and the image sensor 40. The detection volume intended to comprise the particles is therefore preferably located between the grating 32 and the image sensor 40, preferably along the axis of propagation z. Thus, if the detection device comprises a channel configured to allow the flow of a fluid carrying the particles, this channel is therefore preferably located between the grating 32 and the image sensor 40. Alternatively, the detection device is configured so that the objects 21 are located upstream of the grating 32 relative to the incident wave. Thus, the grating 32 is located between the object 21 and the image sensor 40 along the axis of propagation z.

Preferably, the device is further configured so that the distance Z2 between the sample 20, more particularly the objects 21 to be analysed and the grating 32 is less than Z1.

Thus, as indicated above, it is not necessary for the objects 21 to be disposed in contact with the grating 32. Thus, it is possible to have Z200 and more generally 0<Z2<Z1. This allows to relax the constraints on the positioning of the particles 21. It is therefore possible to analyse a sample wherein the position of the particles 21 is not perfectly controlled. This is, for example, the case of particles comprised in a gas stream. Preferably, if Z200, that is to say if the object 21 is not in contact with the grating 32, then the object 21 is expected to be at a distance Z2 from the grating 32 so that $Z2 \leq 100*\lambda$. This allows to improve the quality of the hologram and the digitally reconstructed object.

It is also possible to have all or some of the objects 21 disposed in contact with the grating 32 such that Z2=0. It is in this case that the various examples below are considered.

Z1 and Z2 are measured along the axis of propagation z.

The paragraphs below describe several embodiments of the support 30 comprising the diffraction grating 32.

According to a first embodiment, the support 30 comprises, for example, a transparent layer on which the grating 32 of patterns 31 rests. The transparent layer can be used as a retaining layer for the grating 32, or even as a handling substrate. The transparent layer is, for example, formed from silicon. Preferably, this silicon layer has a small thickness to reduce absorption. Its thickness is typically less than or equal to 100 nm. Preferably, this layer is based on quartz or is made of quartz for visible radiation.

The patterns are, for example, formed of metal or of a dielectric material such as SixOy or SixNy, x and y being non-zero integers.

To produce the support 30, it is possible, for example, to provide a stack comprising at least one transparent layer and one opaque layer covering the transparent layer. The patterns 31 of the grating 32 are then formed by removing part of the opaque layer. For this purpose, use can be made of one of the known lithography techniques. It will be noted that it is possible to keep a continuous layer of the opaque material if, between the patterns 31, the latter has a sufficiently thin thickness to allow a sufficient part of the light waves to pass. This would be, for example, the case with silicon. It is then possible to use nanometric printing techniques.

Alternatively, it is possible to provide for the grating 32 already formed to be added onto the support 30.

According to another embodiment, the periodic structures do not rest on a layer or on a support element. They are suspended in vacuum or air, as shown in FIGS. 22A to 22C.

The patterns 31 are then separated from each other without continuity of matter. Physical apertures 37, that is to say vacuum or air, therefore separate the patterns 31. The patterns 31 are held together, for example by their ends or by junction points 38 as illustrated in FIG. 22A. It is also possible to provide a frame 39 which maintains the patterns 31 as illustrated in FIG. 22B. The diffraction grating 32 thus comprises a frame 39 supporting the patterns 31. The support 30 presented is thus in the shape of a grid. The patterns 31 form the meshes of the grid. According to one embodiment, the patterns 31 are entirely supported by the frame 39. According to one embodiment, the frame 39 extends only around the perimeter of the grating 32.

Figure 22A:
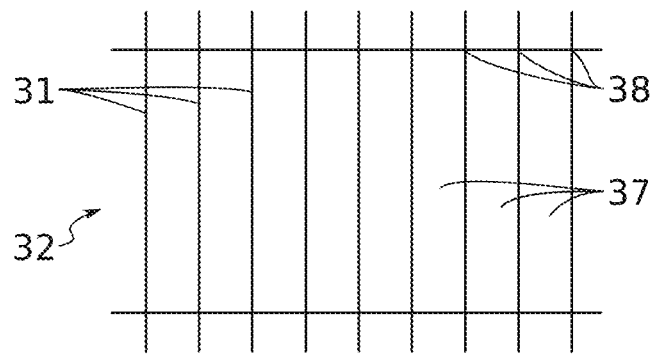
FIGS. 22A to 22C illustrate specific examples of support comprising diffraction gratings. In these examples, the patterns of the gratings are separated by apertures.
Figure 22B:
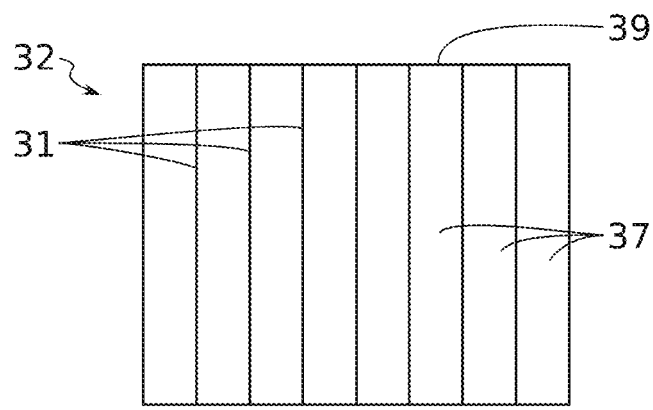
Figure 22C:
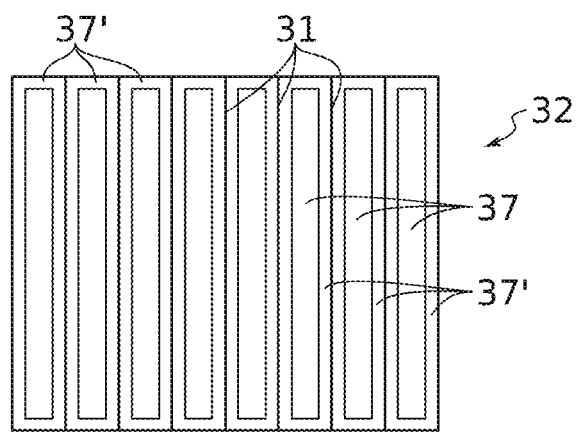

Between the patterns 31, only the apertures 37 can be provided, that is to say an absence of matter as illustrated in FIG. 22A or 22B. Provision can also be made for the patterns 31 to be interconnected by transparent portions 37' and for the apertures 37 to also be present between the patterns 31. An example of this embodiment is illustrated in FIG. 22C.

Figure 2A:
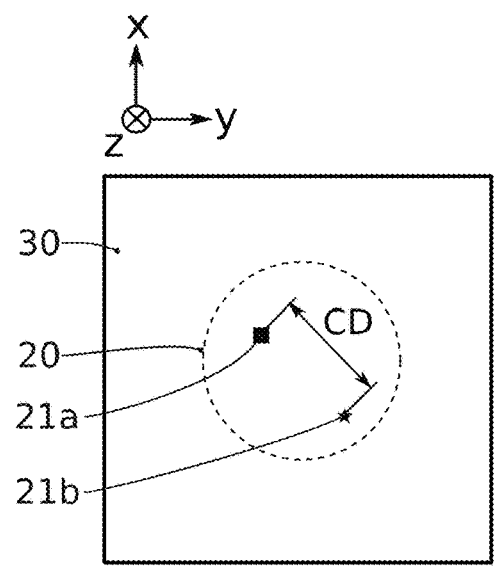
FIGS. 2A to 2C illustrate the results obtained, with a detection device according to the prior art, to analyse a first sample.
Figure 2B:
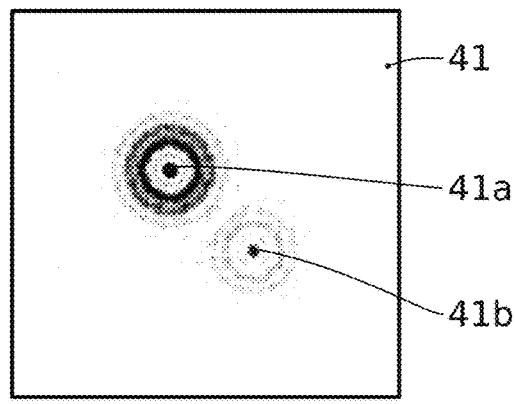
Figure 2C:
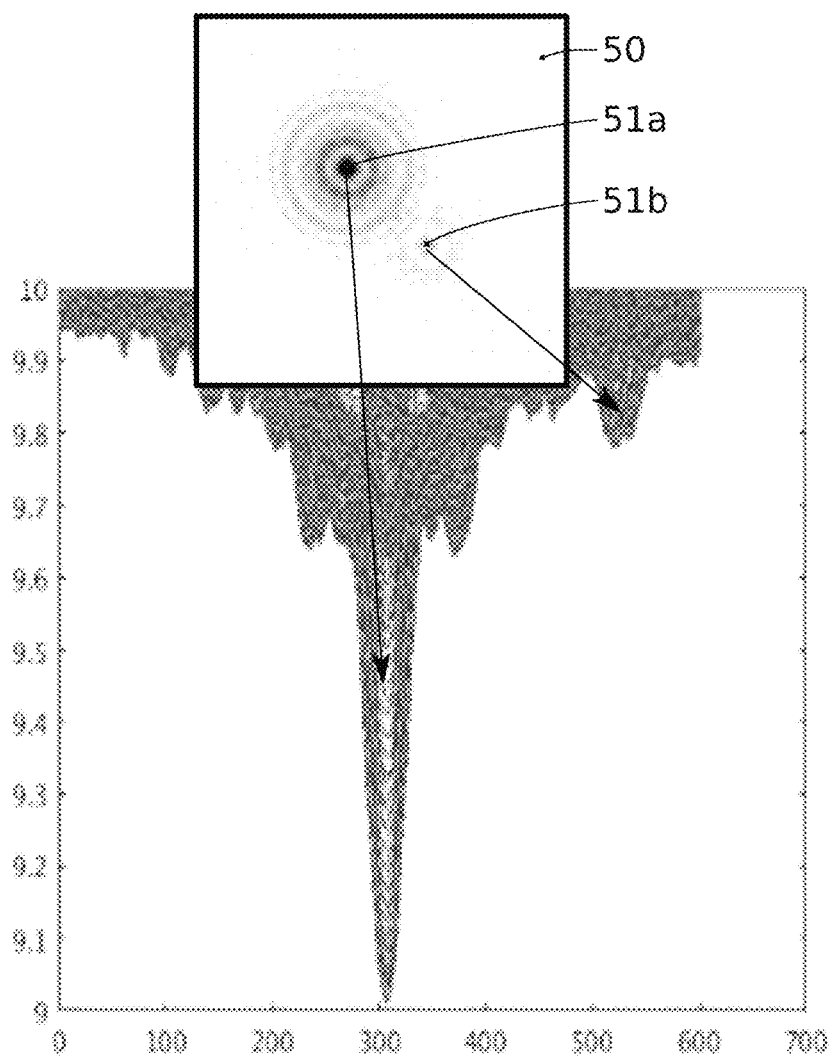

All these embodiments including apertures 37 allow to further increase the transparency of the areas between the patterns 31 and ultimately to obtain an even more precise reconstructed image. One-dimensional patterns are illustrated in FIGS. 2A-2C. Naturally, these embodiments with apertures 37 are applicable to any type of pattern.

The absence of magnification optics between the sensor 40 and the sample 20 is noted. This does not prevent the possible presence of focusing microlenses at each pixel of the sensor 40, the latter not having the function of magnification of the image acquired by the sensor 40. The microlenses of the CMOS sensors allow to collect more optical flux to be concentrated on the active area of the sensor 40 which occupies only a small part of the image pixel.

Under the effect of the incident light wave 11, the object 21 of the sample 20 can generate a diffracted wave 13, capable of producing, at the detection plane $P_0$, interference, in particular with a wave called reference wave. This reference wave is an incident wave which may or may not have been diffracted by the diffraction grating. This reference wave is advantageously a part of the incident light wave 12 transmitted by the sample 20, without diffraction by the object 21 of the sample. It can be transmitted through the support 30. Note that with or without a diffraction structure, only part of the incident wave is transmitted. Moreover, the sample 20 can absorb part of the incident light wave 11. Thus, the light wave transmitted by the support 30, and to which the image sensor 20 is exposed, can comprise:

- a component not diffracted by the sample 20 and at least part of which is possibly diffracted by the grating 32 of the support 30. This component corresponds to a part of the incident light wave 12 not absorbed by the sample 20.
- a component resulting from the diffraction of the incident light wave 11 by the sample 20 and at least part of which is also diffracted by the grating 32.

This resulting light wave 14 can also be designated by the term "exposure light wave". This exposure light wave 14 generates on the sensor 40 an image 41 also referred to as a holographic or hologram image.

It will be noted that the detection device illustrated in FIG. 1 is called "online" detection device, since the object 20, the support 30 and the sensor 40 are located on the axis of propagation z of the incident wave 11. It will be noted that the invention also applies to detection devices which are not online and which are usually referred to as a transmission hologram, in the "off axis" configuration. In these detection devices, the component not diffracted by the sample and the component diffracted by the sample follow different optical paths, having non-parallel axes. Provision can be made for one of these two components to reach the image sensor 40 after at least one reflection on a reflector.

Computer equipment 60, comprising a data processing device 61 such as a processor, for example a microprocessor, is able to process each image acquired by the image sensor 40. In particular, the processor is a microprocessor connected to a programmable memory wherein is stored a sequence of instructions for carrying out the operations of image processing and of reconstruction calculations of the holographic image so as to obtain a digitally reconstructed image 50. The processor can be coupled to a screen 62 and optionally to a user interface 63. The screen 62 allows the display of images acquired by the image sensor 40 or calculated by the processor.

The image 41 acquired on the image sensor 40, also called a hologram, does not allow to obtain a sufficiently precise representation of the sample 20 observed. It is possible to apply, to each image 41 acquired by the image sensor 40, a propagation operator, so as to calculate a quantity representative of the exposure light wave 14 transmitted by the sample 20, and to which the sensor 40 is exposed. Such a method, conventionally designated by the term holographic reconstruction, allows in particular to reconstruct an image of the module or of the phase of this exposure light wave 14 in a reconstruction plane parallel to the detection plane $P_0$, and in particular in the plane $P_{30}$ along which the sample 20 mainly extends.

To perform a holographic reconstruction from the image 41 generated by the sensor, reference may be made to the following publications "Practical algorithms for simulation and reconstruction of digital in-line holograms" (Applied Optics, Vol. 54, Issue 9, pp. 2424-2434 (2015) DOI: 10.1364/AO.54.002424).

In a very simplified way, from the image 41 generated by the sensor 40, the wavelength(s) 2, the distance Z1 and the nature of the incident wave (plane or spherical), the following main steps are carried out to digitally reconstruct the image of the object 21:

1/ Reading the digital hologram. This matrix is, for example, named "Holo(x,y)". It describes the hologram. This matrix matches a light intensity to each point of the hologram. This matrix depends on:

- the number of pixels of the image sensor 40 "NbPix". For the sake of simplicity, provision can be made for the matrix of the image sensor to be square and to have a number N of pixels per side (that is to say per row and per column). Also for the sake of simplicity, provision is made for the object to be assimilated to a matrix of the same dimensions as those of the image sensor. However, this simplification is perfectly reasonable, in the absence of an optical device located between the object and the image sensor.
- the size of the object "sizeObject". This size of the object thus corresponds to the width of the matrix assimilated to the object.

The distance Z between the imager and the object. For the sake of simplicity, the object is considered to be in contact with the diffraction grating. Thus, Z=Z1.

2/ Defining the propagation matrix in the image plane. This matrix depends on: N (number of pixels per side); A; sizeObject; Z1). This matrix is, for example, named "Prop (N; lambda; sizeObject; Z)".

Z can be defined as an iteration variable to optimise the ideal position for reconstruction of the image. Indeed, the distance between the particle and the plane of the digital hologram recording sensor may vary and may not be perfectly known. It can then be found by the reconstruction calculation, by adjusting the value of Z.

3/ multiplying the hologram by the propagation matrix, that is to say: HoloZ (x,y)=Holo(x,y)*prop(N; lambda; sizeObject; Z)

4/ then performing the inverse transformation of the result obtained in the previous step: Rec=FFTinverse 2D(HoloZ).

More generally, reference may be made to document WO 2017/178723 to precisely characterise an object or a particle from an image 41 produced by the sensor 40.

According to an optional embodiment, the presence of the grating 32 can be taken into account, by applying an image processing, for example by applying a spectral filter. This allows to further improve the quality of reconstruction of the object.

As indicated in this document, in order to reconstruct an image of the module or of the phase of the exposure light wave 14 in a reconstruction plane parallel to the detection plane $P_0$ of the image sensor 40, a convolution product of the image 41 acquired by the image sensor 40 is carried out by a propagation operator h. It is then possible to reconstruct a complex expression A of the exposure light wave 14 at any coordinate point (x, y, z) in space, and in particular in a reconstruction plane $P_z$ located at a distance |z| from the image sensor 40, this reconstruction plane possibly being the plane of the sample $P_{30}$, in the case where |z|=Z1. The complex expression A is a complex quantity whose argument and modulus are respectively representative of the phase and the intensity of the light wave 14 to which the image sensor 40 is exposed. The convolution product of the image 41 by the propagation operator h allows to obtain a complex image $A_z$ representing a spatial distribution of the complex expression A in a plane, called the reconstruction plane $P_z$, extending to a coordinate z of the detection plane $P_0$. In this example, the detection plane $P_0$ has the equation z=0. This complex image corresponds to a complex image of the sample in the reconstruction plane $P_z$. It also represents a two-dimensional spatial distribution of the optical properties of the wave 14 to which the image sensor 40 is exposed.

The function of the propagation operator h is to describe the propagation of light between the image sensor 40 and a point of coordinates (x, y, z), located at a distance |z| from the latter. It is then possible to determine the modulus M(x,y,z) and/or the phase φ(x,y,z) of the light wave 14, at this distance |z|, called reconstruction distance, with:

$$M(x,y,z)=\text{abs}[A(x,y,z)]$$

$$\varphi(x,y,z)=\text{arg}[A(x,y,z)]$$

The operators "abs" and "arg" denote the modulus and the argument respectively. In other words, the complex expression A of the light wave 14 at any coordinate point (x, y, z) of space is such that:

$$A(x,y,z)=M(x,y,z)e^{j\varphi(x,y,z)}$$

Obtaining a complex image $A_z$ of the sample by applying a propagation operator to a hologram is known from the prior art, in particular for the purposes of characterising particles, as evidenced by the references indicated above and in the section relating to the prior art.

By providing a grating 32 acting as a spatial filter on the support 30, the device according to the invention allows to considerably improve the resolution of the reconstruction of the object from the image 41.

Figure 24:
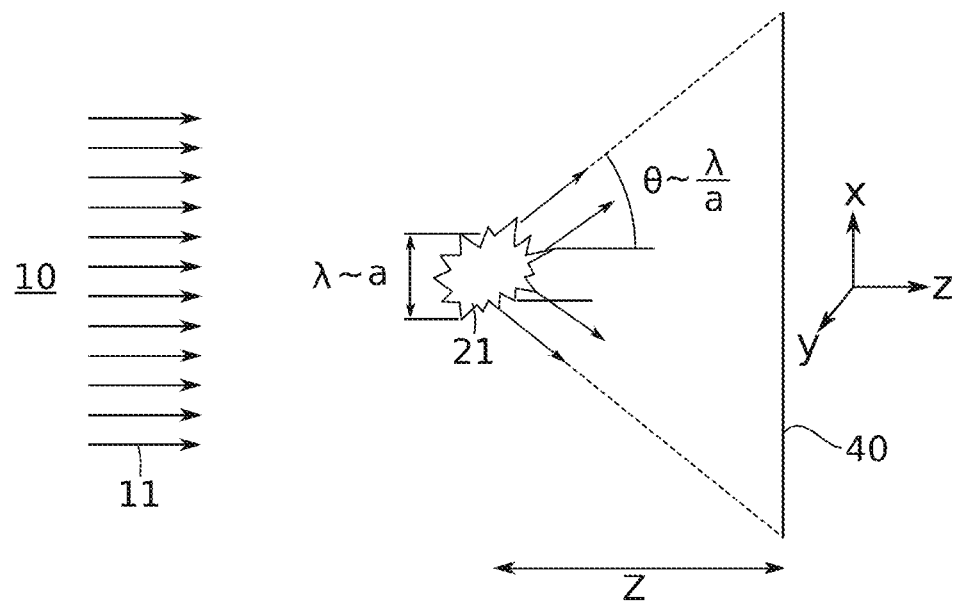
FIG. 24 schematically shows a portion of an example of a holographic imaging detection device according to the prior art.

As illustrated in FIG. 24, with a detection device according to the prior art (FIG. 1), the recording of an online hologram of a particle 21 scattering light is limited, on the one hand, by the interaction between the incident wave 11 and the particle 21 which scatters the light, and on the other hand, by the distance from the image sensor 40 and its surface area (in the plane xy) which records the hologram. The more light the image sensor 40 collects from the particle 21, the more faithful the reconstruction will be to the particle 21 to be analysed. This is the case for a large image sensor 40 whose distance Z to the particle 21 to be analysed is small, in order to have the greatest possible numerical aperture.

Figure 25:
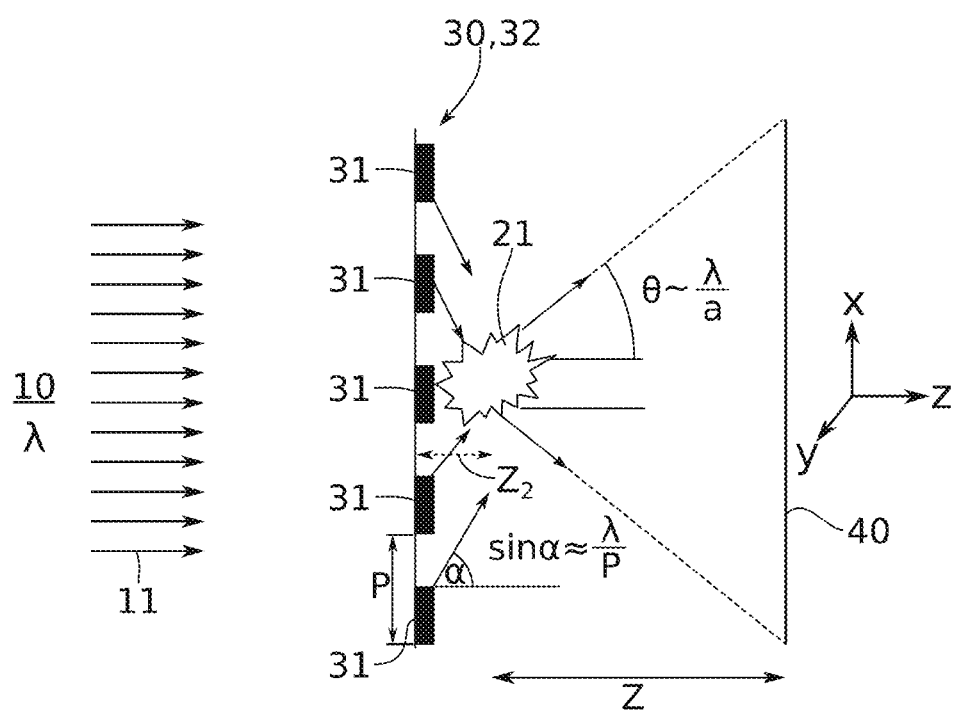
FIG. 25 schematically shows a portion of an example of a holographic imaging detection device according to the invention.

As illustrated in FIG. 25, with a detection device according to the invention, the provision of a diffraction grating 32, the period of which is close to the incident wavelength λ 11, allows to increase the interaction between the light and the particle 21. For the same recording configuration (distance Z and width of the image sensor 40), the image sensor 40 will collect more light scattered by the particle 21. Indeed, if the particle 21 is disposed between the grating 32 and the image sensor 40, the light diffracted by the grating 32 which will then also be intercepted by the particle 21 will be added to the incident light scattered by the particle 21 and transmitted by the grating 32. The effect is the same if the diffraction grating 32 is located between the particle 21 and the image sensor 40.

In the optimum case, the particle 21 is in contact with the grating (Z2=0), the grating has a period P=λ. Moreover, the diffraction takes place at 90° of the incident wave (transversely) which allows the particle 21 to collect and interact with a transverse wave.

For gratings with a period P<λ, the diffraction angles will be smaller and therefore less effective when the particle 21 is in contact with the grating. But, in this case, the particle 21 could be shifted from the grating at a distance Z2≠0, the optimum of which will be a function of P, λ, the size of the particle 21 and Z.

Figure 3A:
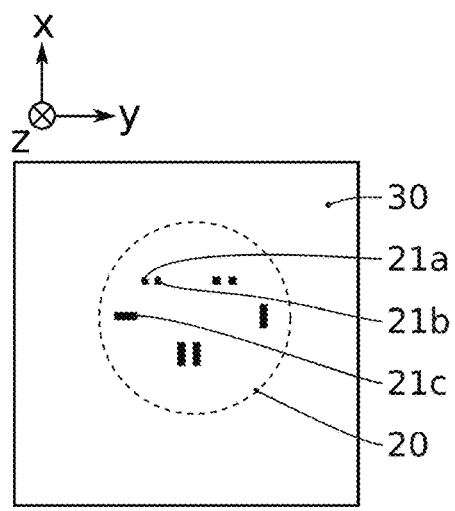
FIGS. 3A to 3C illustrate the results obtained, with a detection device according to the prior art, to analyse a second sample.
Figure 3B:
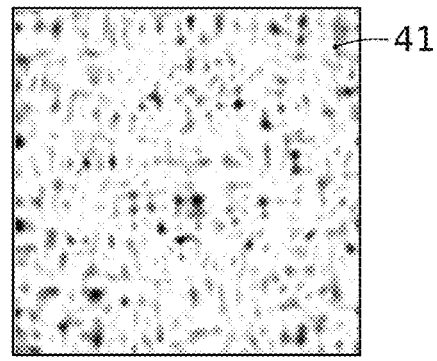
Figure 3C:
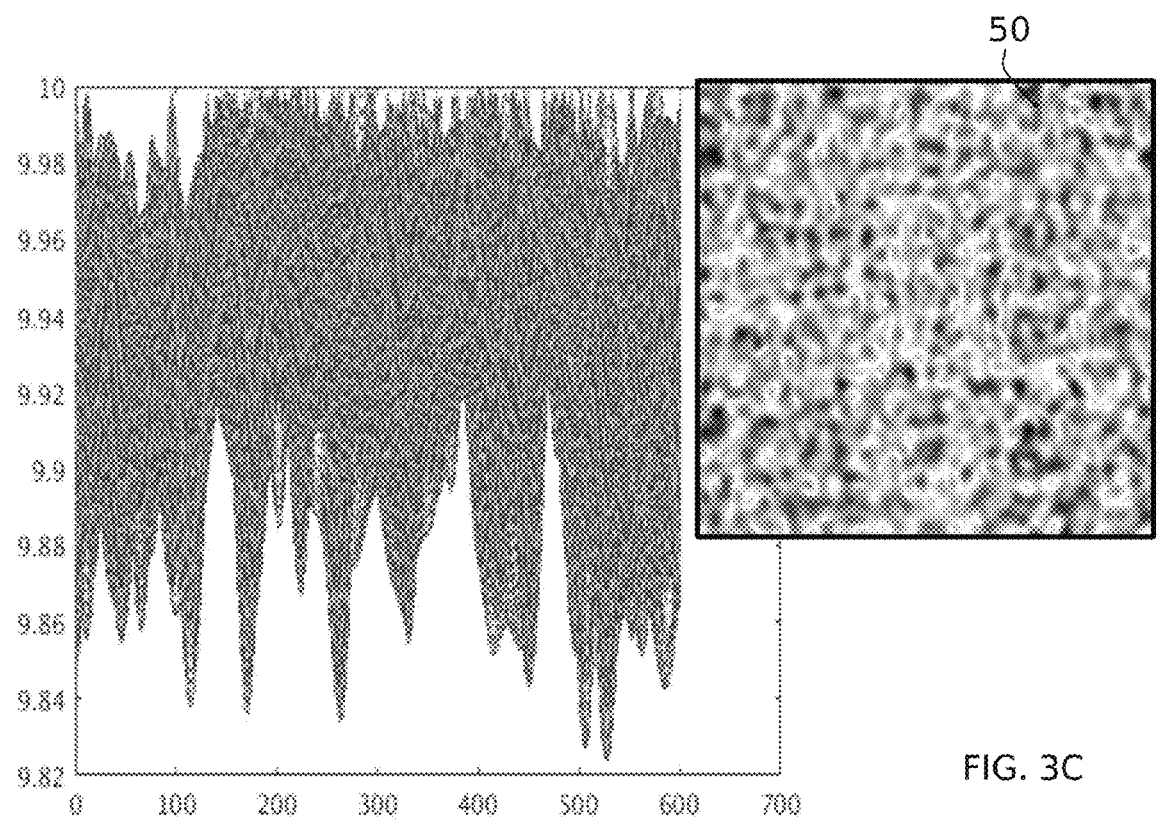
Figure 5A:
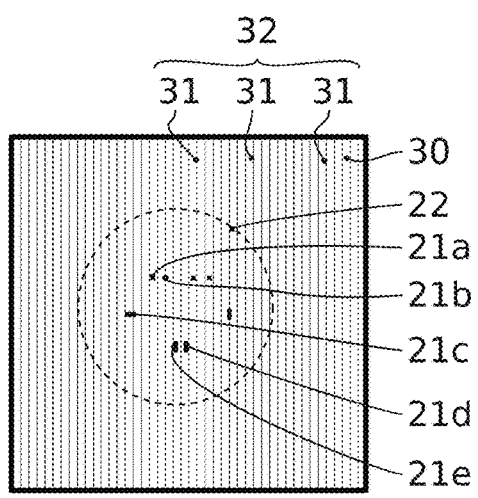
FIGS. 5A to 5C illustrate the results obtained by analysing the same sample as for FIGS. 2A to 2C, but with a device according to the invention.
Figure 5B:
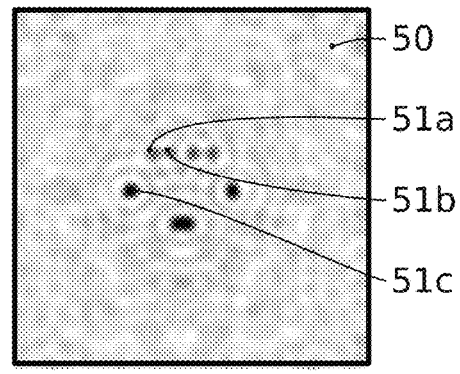
Figure 5C:
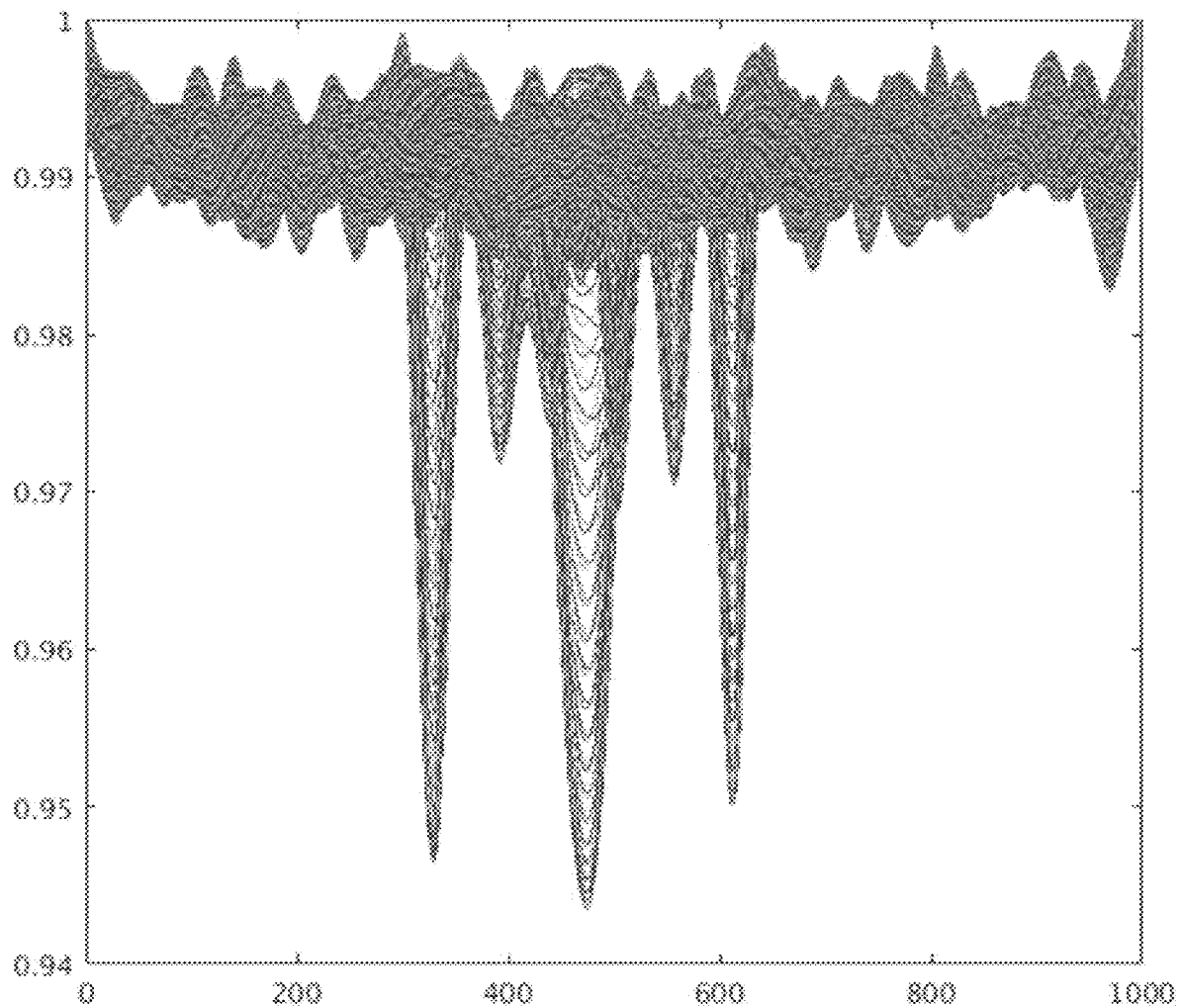

FIGS. 5A and 5C correspond to the same case as that illustrated in FIGS. 3A to 3C. The sample 20 comprises a scene 22 showing the same particles 21a-21e as in FIGS. 3A-3C. The wavelength of the source is identical (450 nm) and the detector is identical except that the support 30 has a grating 32. Here, this grating 32 is formed of lines parallel to each other and distributed periodically according to a pitch P=λ=450 nm. FIGS. 5B and 5C show the results of the digital reconstruction of the image 41 generated by the sensor 40. These results are indisputably better than those of FIG. 3C. In particular, it is possible to identify the particles and even to distinguish the particles 21a and 21b as illustrated by the spots 51a and 51b of FIG. 5B. It will be noted that a still significantly improved result can be obtained by choosing a grating whose patterns would be better adapted to this scene 22. The identification of an optimal grating 32 can be obtained by trying various gratings and then by comparing the resolutions obtained with each grating.

The paragraphs below describe the effects of the period of the grating patterns on the contrast and the resolution of the reconstructed hologram.

Figure 6:
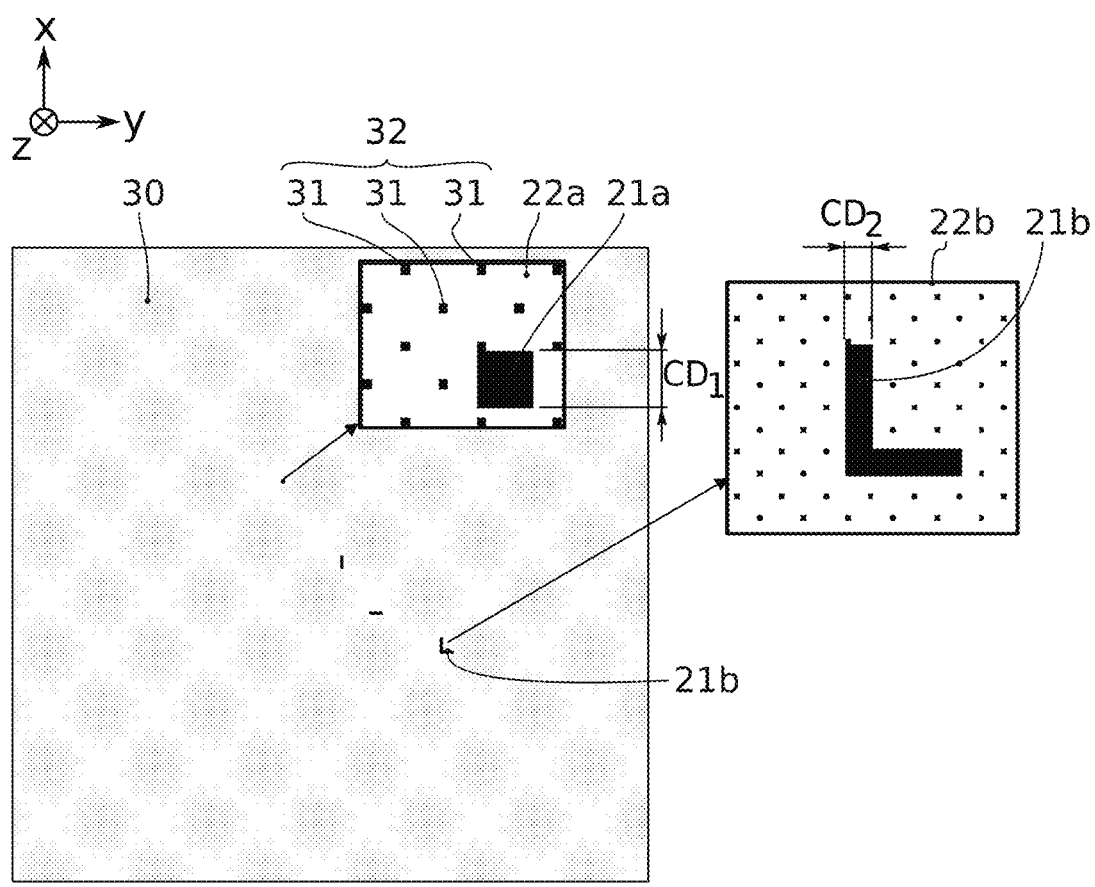
FIG. 6 schematically shows an example of a two-dimensional diffraction grating equipping a detection device according to the present invention.

FIG. 6 illustrates a support 30 having a grating 32 formed of point patterns 31. This grating 32 can thus be qualified as a two-dimensional grating. Indeed, the patterns 31 have a first alignment in the direction x and have a second alignment in the direction y. The pitch P of the grating is identical in these two directions.

The observed sample 20 has in particular the objects 21a and 21b which appear in an enlarged manner in the scenes 22a and 22b.

In this example, the wavelength λ is equal to 450 nm. The critical dimensions CD1, CD2 shown in FIG. 6 are of the order of 225 and 337 nm, respectively.

FIGS. 7A to 7D illustrate the results of the reconstruction of the holographic image 41 generated by the sensor according to the support 30 used.

Figure 7A:
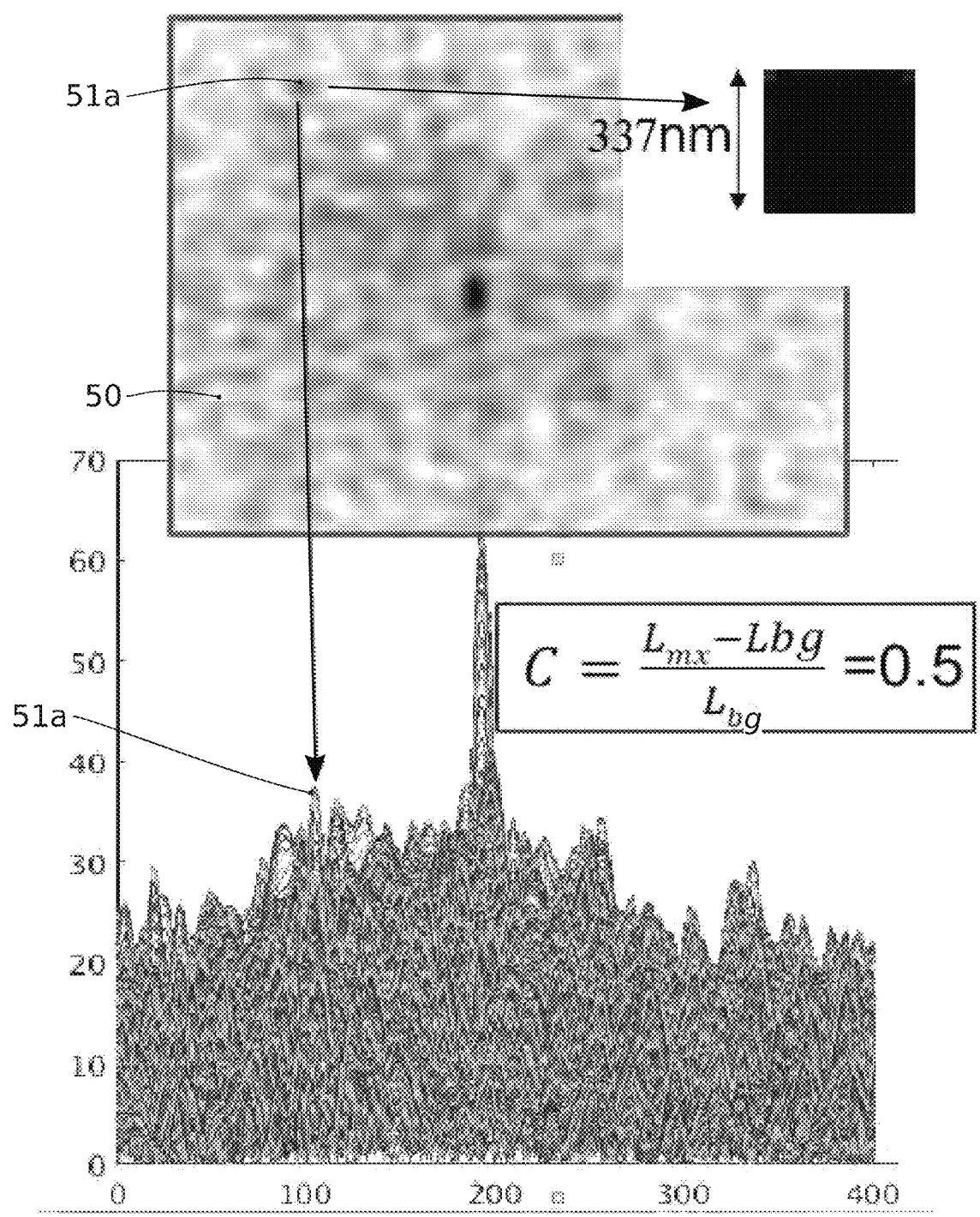
FIG. 7A illustrates the results obtained by analysing a sample with a device according to the prior art.

FIG. 7A corresponds to the case where the support 30 does not have a grating 32. The support thus forms a transparent plate. This embodiment thus corresponds to the solutions of the prior art. It is clear that it is very difficult to identify the particles and in particular the particle 21a. Indeed, on the digitally reconstructed image 50, the object 51a appears very indistinctly. The contrast C is equal to 0.5. In the equation C shown in FIGS. 7A to 7D, $L_{mx}$ and $L_{bg}$ correspond respectively to the maximum received light intensity and the average light intensity. The calculation of the contrast C can be done on the following equation $C=(L_{mx}-L_{bg})/L_{bg}$. In this embodiment, the image 50 is a square of 25.58 μm side.

Figure 7B:
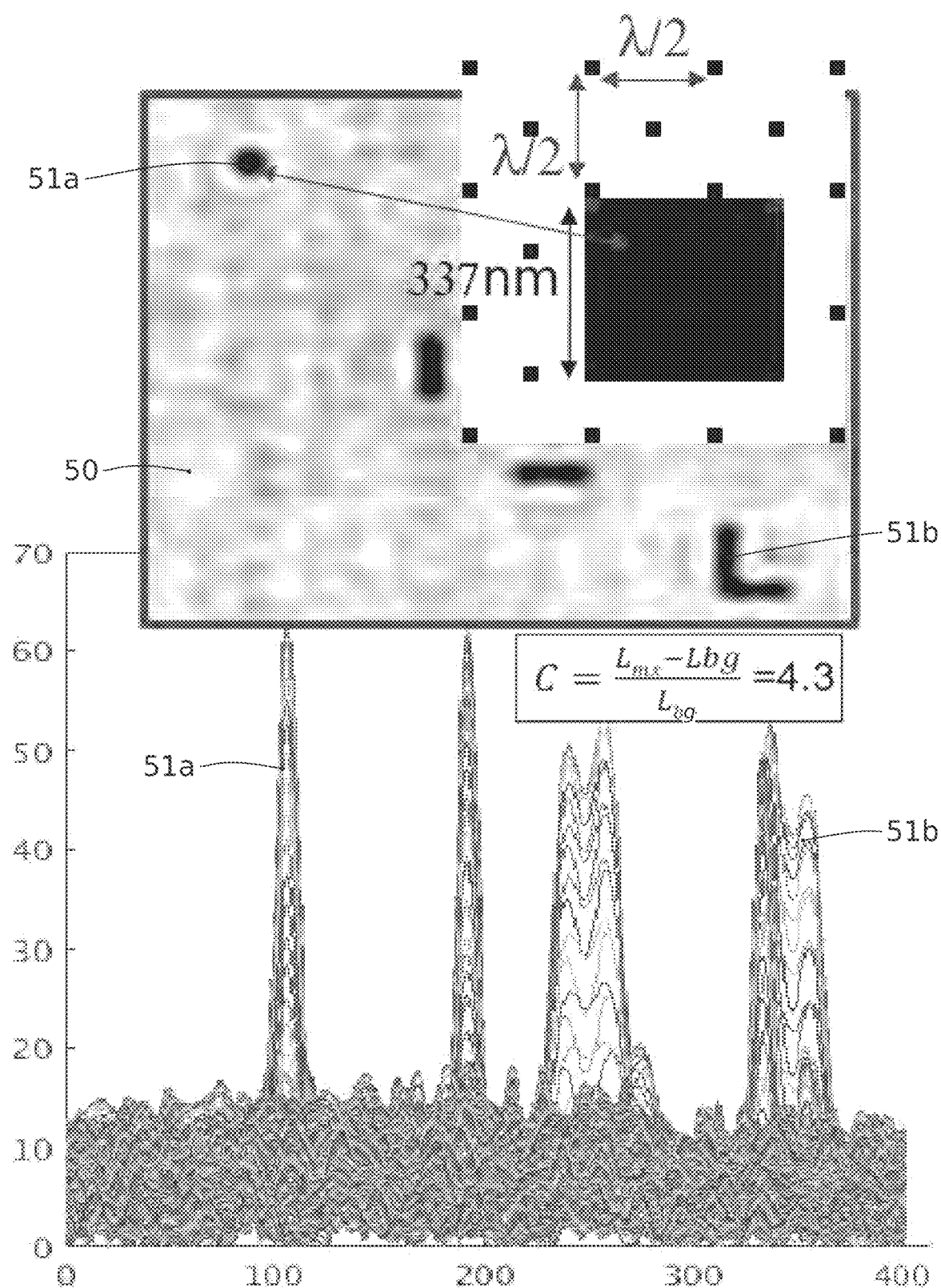
FIGS. 7B to 7D illustrate the results obtained by analysing the same sample as for FIG. 7A, but with devices according to the invention having gratings whose geometries are identical to that of FIG. 6, but whose periods vary.

FIG. 7B corresponds to the case where the support 30 has a grating 32 whose pitch P=λ/2. It can be seen that it is possible to identify all the different particles. In particular, on the image 50 obtained by reconstruction of the hologram, the images 51a, 51b of the particles 21a, 21b are very easily identifiable. The contrast C is equal to 4.3.

Figure 7C:
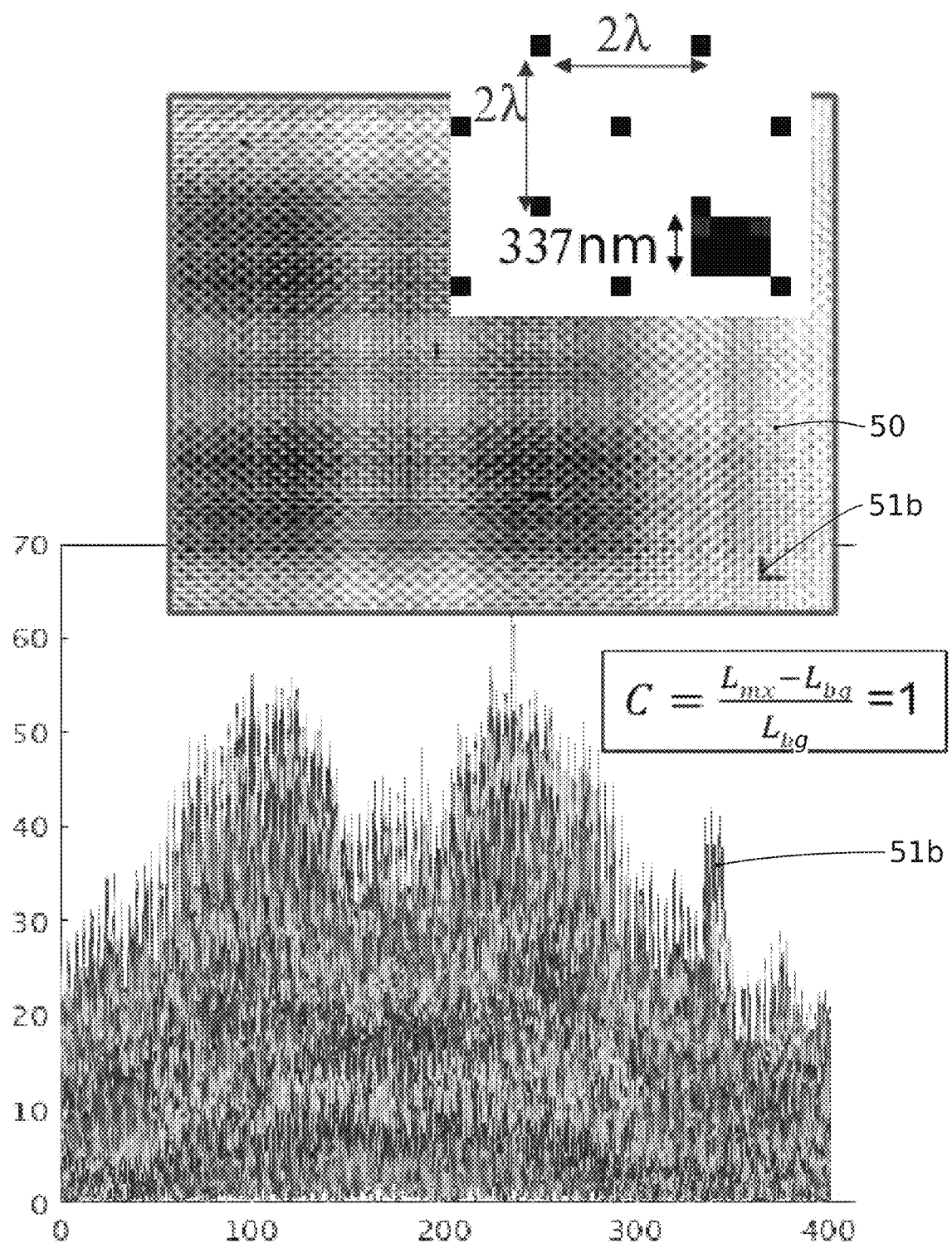

FIG. 7C corresponds to the case where the support 30 has a grating 32 whose pitch P=2λ. It can be seen that with this grating also it is possible to identify the different particles. The contrast C is equal to 1.

Figure 7D:
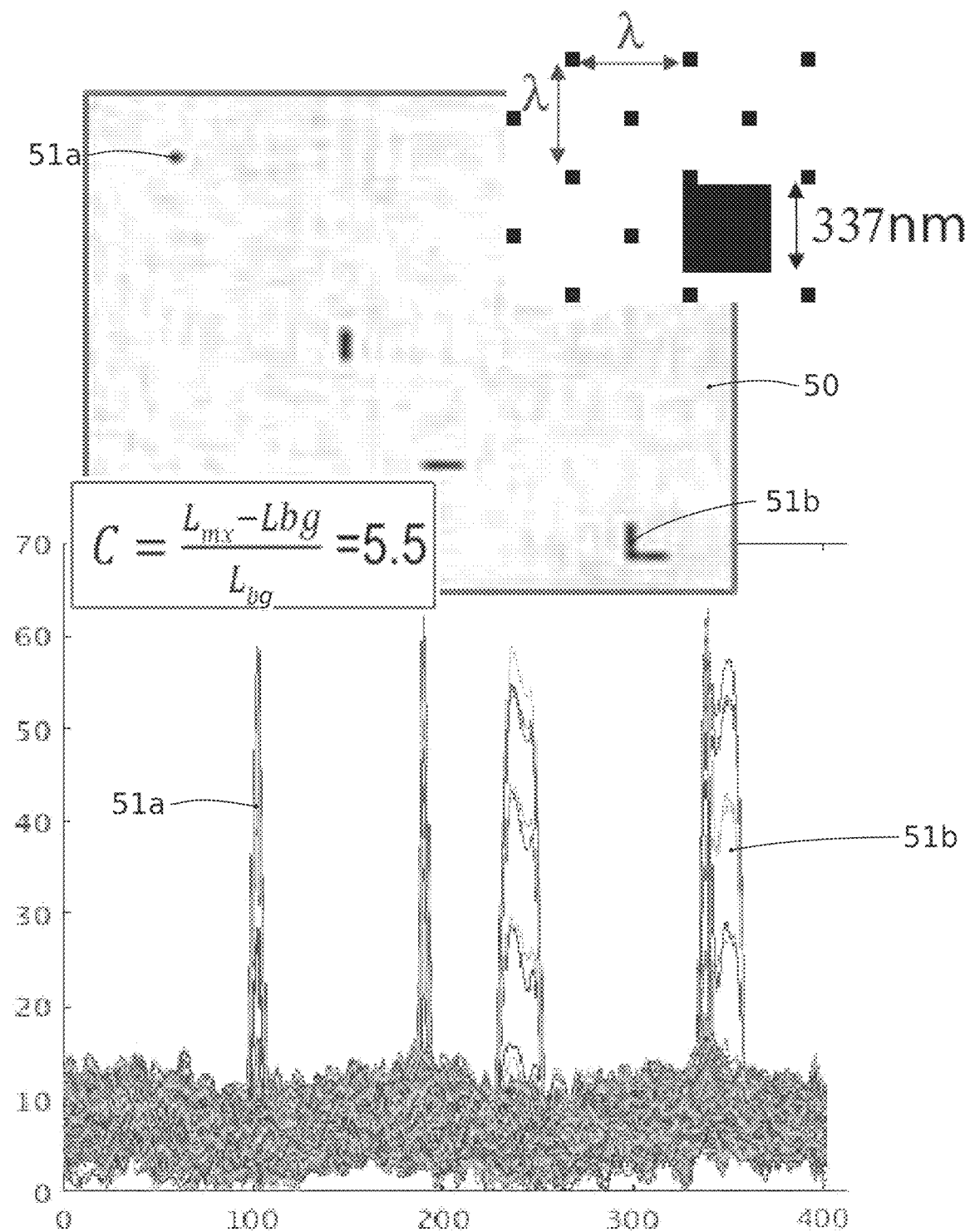

FIG. 7D corresponds to the case where the support 30 has a grating 32 whose pitch P=λ. The resolution is still significantly higher than that of FIG. 7B or FIG. 7C. The contrast C is equal to 5.5, which is much higher than that of the embodiments with P=λ/2 or P=2λ.

In these embodiments of FIGS. 7A to 7D, the size of the images 41 are squares whose side lengths are respectively 25.58 μm, 53.15 μm and 106.3 μm. In the examples described, the same dimensions and the same number of pixels were used for the calculations to describe the object and the hologram. At the sensor 40, the pixel density per line is 925 pixels. The size or the pitch of each pixel of the pixel matrix of the sensor 40 are, respectively for the embodiments of FIGS. 7B to 7D: 28 nm (P=λ/2), 112.5 nm (P=2λ) and 56 nm (P=λ).

It emerges from these figures that a pitch P equal to or close to λ is very clearly advantageous. A pitch P greater than 2λ no longer allows to obtain a truly satisfactory resolution.

Figure 8A:
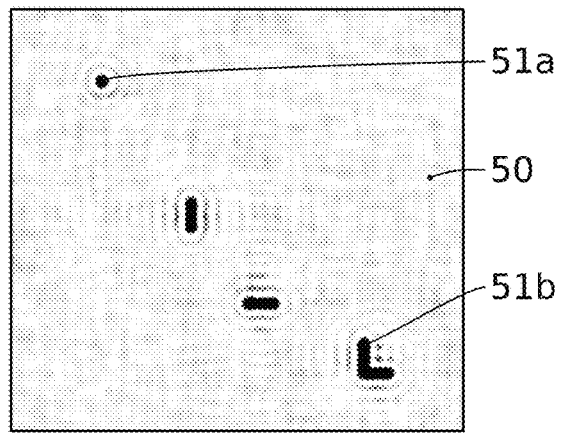
FIG. 8A schematically shows an example of a one-dimensional diffraction grating equipping a detection device according to the present invention.
Figure 8B:
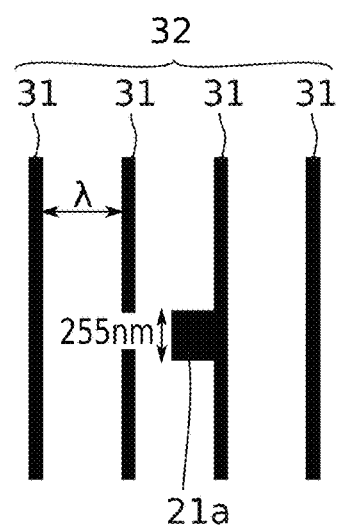
FIGS. 8B and 8C illustrate the results obtained by analysing the same sample as for FIGS. 7A to 7D, but with the device of FIG. 8A integrating a one-dimensional grating.
Figure 8C:
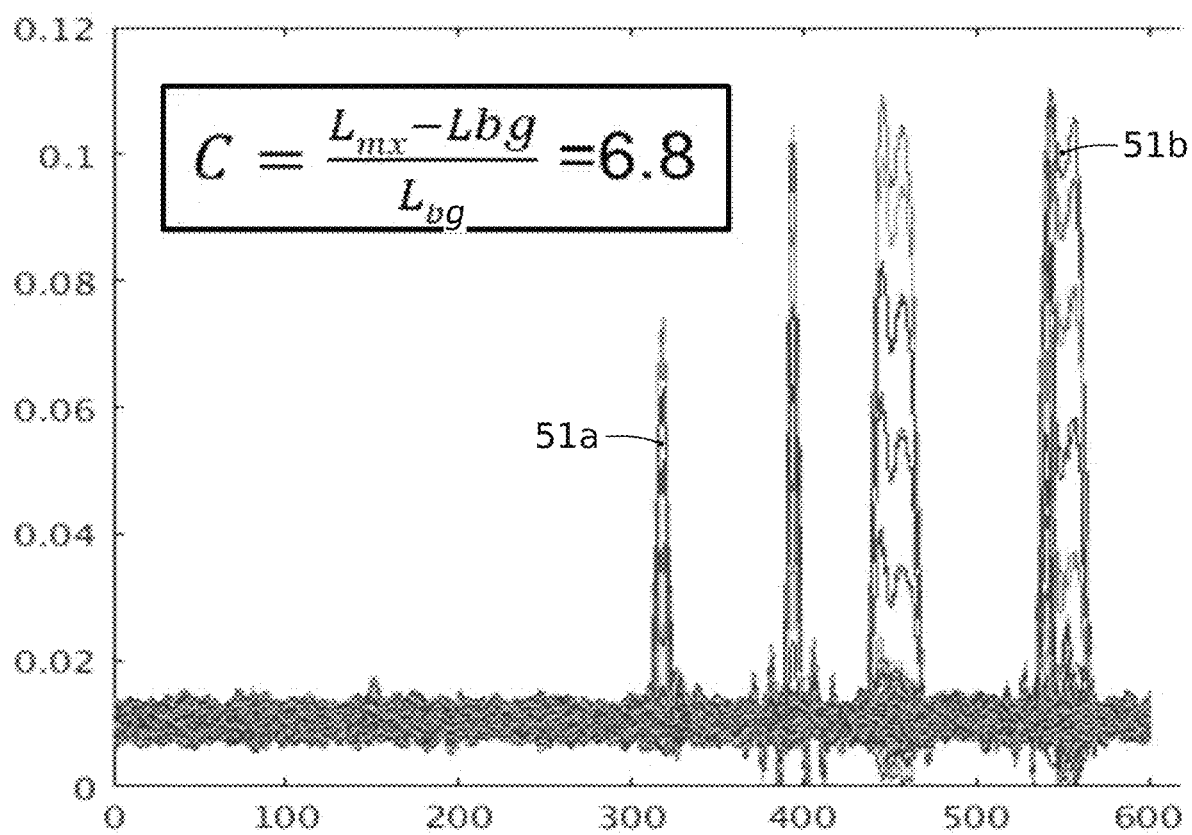

FIGS. 8A to 8C illustrate the result obtained with the same sample as that observed in FIGS. 7A to 7D but with a one-dimensional grating 32 (1D). The grating 32 is formed of patterns 31 defined by parallel lines. Each line is, for example, formed by an opaque stroke. The period of the grating is equal to λ. In this embodiment, the width of a stroke, taken in a direction perpendicular to the main direction of extension of the stroke, is approximately λ/4. FIGS. 8A and 8C show that the resolution obtained is very good. The images 51a, 51b of the particles 21a, 21b in particular, are very easily identifiable. The contrast C is equal to 6.8. This contrast is better than that obtained in the embodiment of the 2D grating 32 having a pitch P=λ, because the patterns are finer and therefore the support 30 blocks less light, thereby improving the contrast.

It emerges from these examples that any type of periodic pattern 31 (1D or 2D) can be used to improve the reconstruction of the object from the recording of the hologram 41. A periodic grating 32 with a period close to the object 20 illumination wavelength λ will be optimal for the digital reconstruction of the object from the recorded image 51 of the hologram.

Figure 9A:
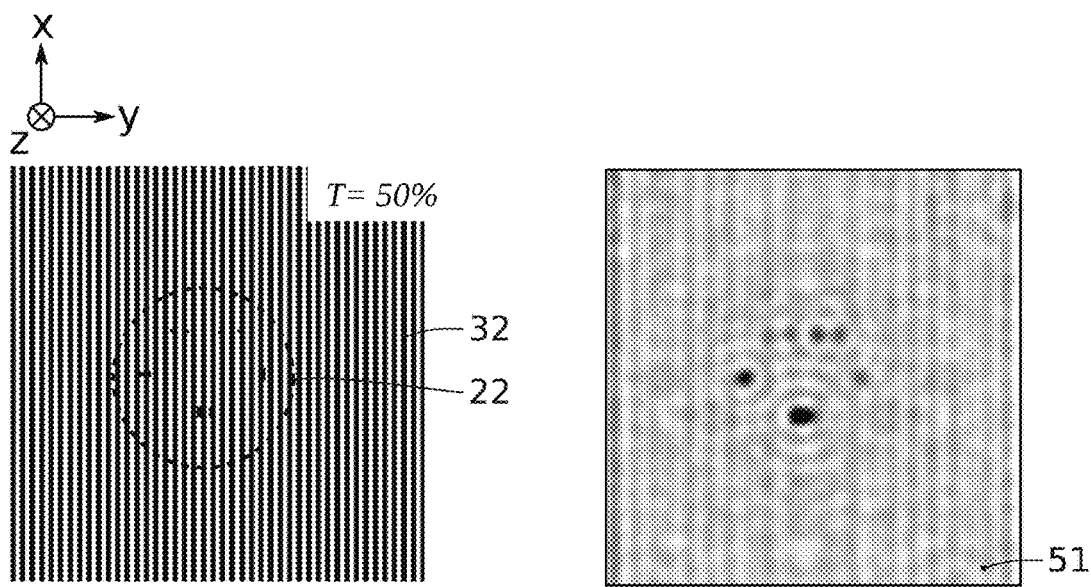
FIGS. 9A to 9C show the results obtained by analysing the same sample with gratings having identical periods but having different recovery rates.
Figure 9A:
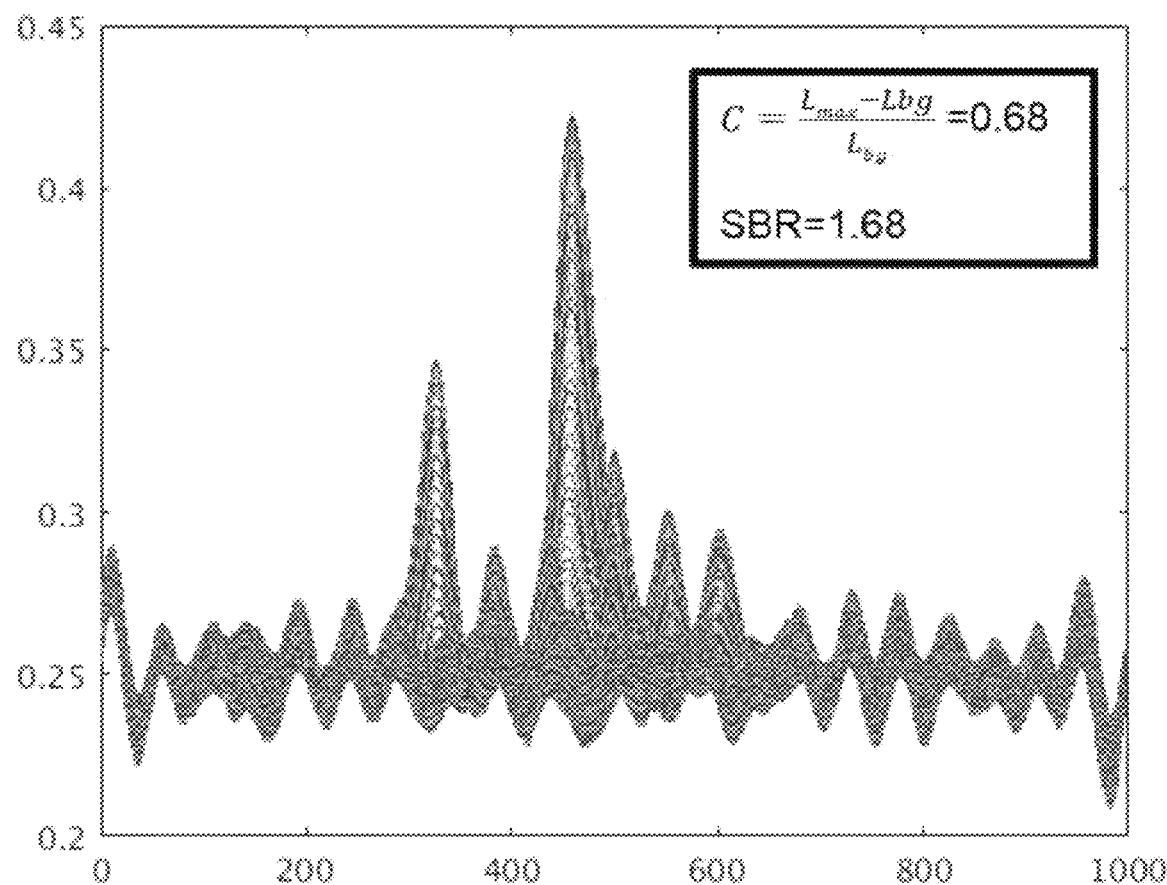
Figure 9B:
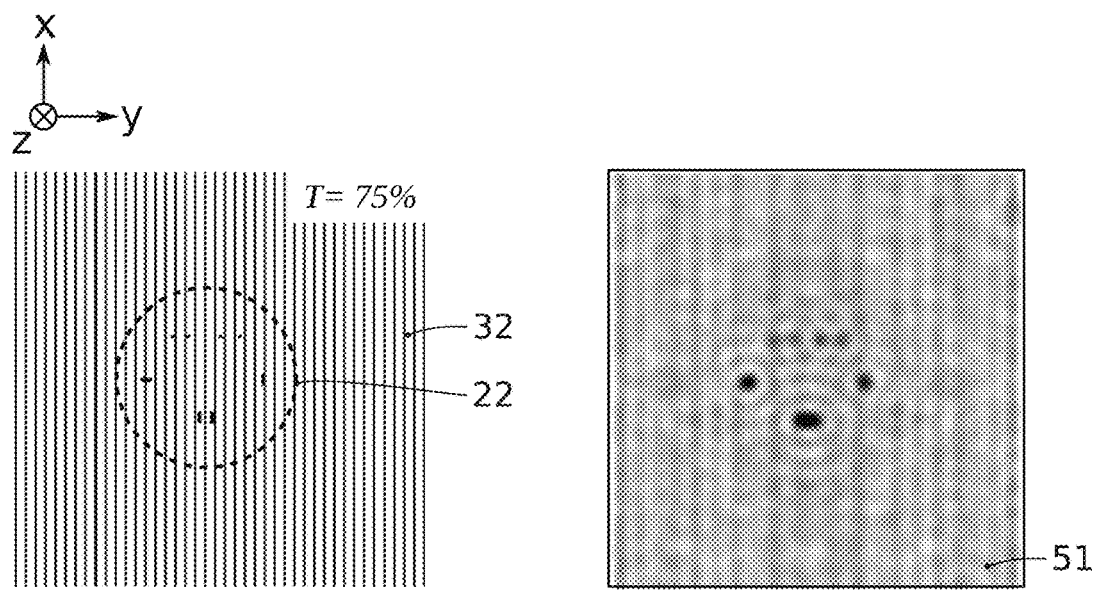
Figure 9B:
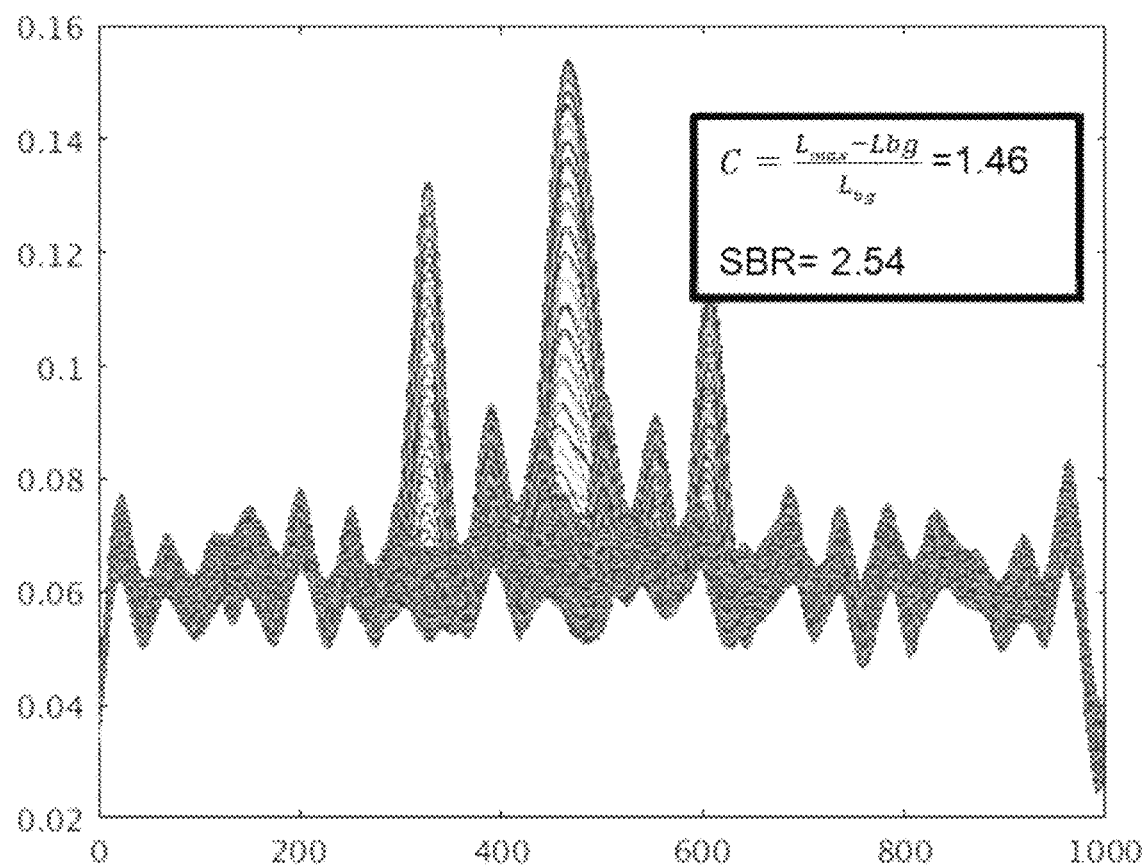
Figure 9C:
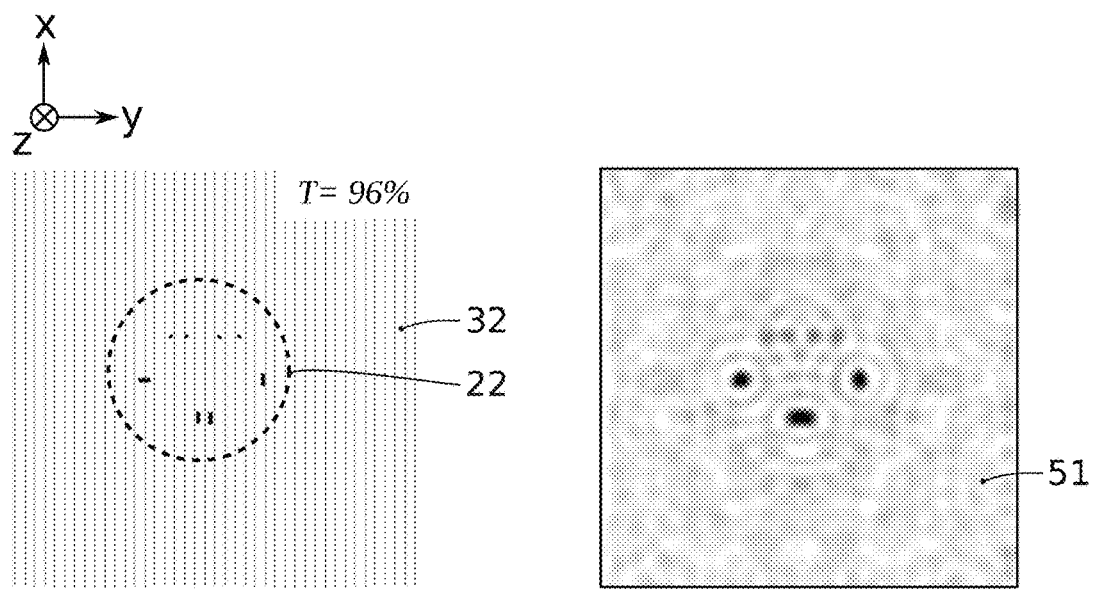
Figure 9C:
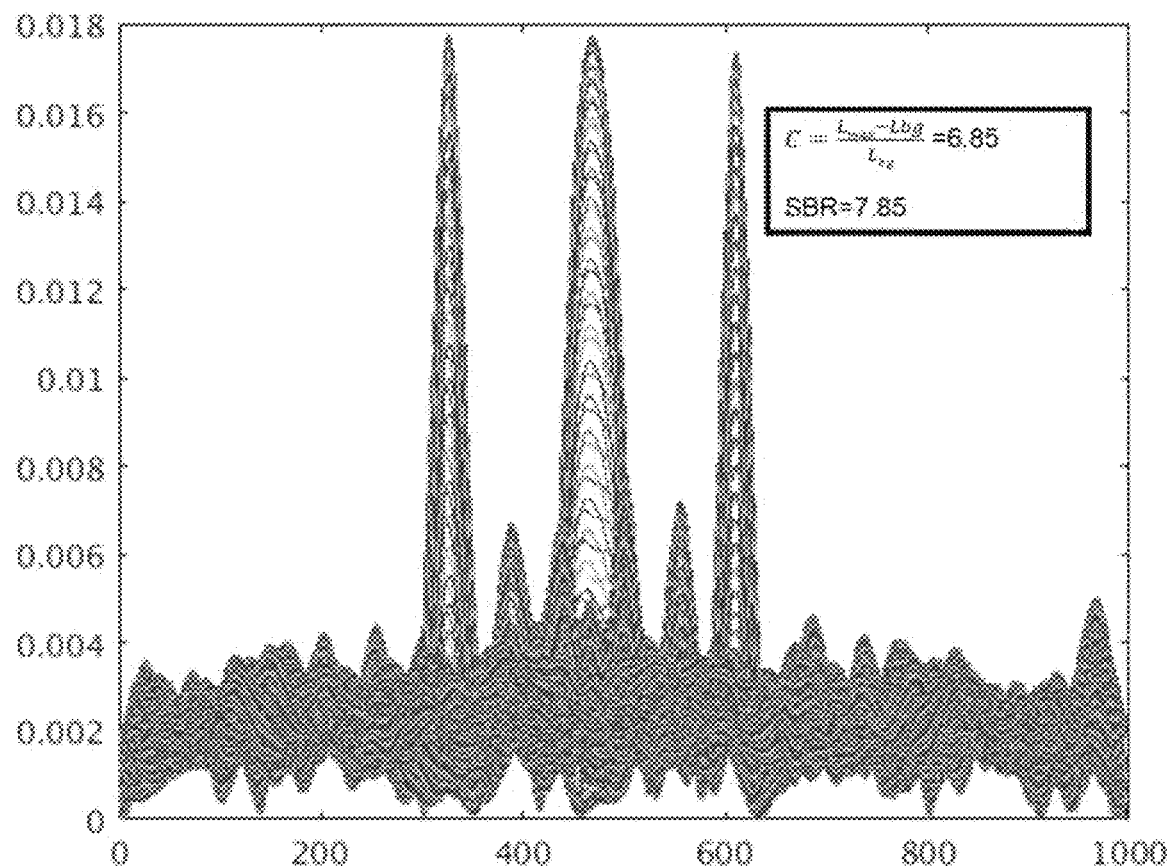

FIGS. 9A to 9C illustrate the influence of the filling rate of the diffraction grating 32 on the resolution obtained.

For each of these embodiments, the observed sample 20 comprises the same scene 22 as that of FIG. 3A or 5A. For each of these embodiments, the grating 32 is a 1D grating, formed by opaque strokes, extending in this non-limiting example along the axis x. The pitch P of each grating is identical. The only difference is the thickness of each pattern, that is to say, the width of each stroke, taken in the direction y. This variation in thickness thus directly impacts the filling rate of the structure 30. The term "filling rate" denotes the percentage of the surface area occupied by the opaque patterns to the total surface area of the support 30. Conversely, the term "transmission rate" denotes the percentage of the surface area not occupied by the opaque patterns to the total surface area of the support 30. If the opaque patterns occupy the entire surface area of the support 30, then the transmission rate is zero. Conversely, if the support 30 does not include opaque patterns, then the transmission rate is equal to 100%.

In the example illustrated in FIG. 9A, the thickness of each stroke is such that the transmission rate T=50%. The contrast C=0.68. The signal-to-noise ratio SBR=1.68.

In the example illustrated in FIG. 9B, the thickness of each stroke is such that the transmission rate T=75%. The contrast C=1.46. The signal-to-noise ratio SBR=2.54.

In the example illustrated in FIG. 9C, the thickness of each stroke is such that the transmission rate T=96%. The contrast C=6.85. The signal-to-noise ratio SBR=7.85.

It emerges from these figures that the contrast and the signal-to-noise ratio are much better if the periodic structure 32 is transparent.

In the examples which follow, the periodic diffraction structure of the support 30 includes several gratings 32. The pitch P of each grating 32 is adapted for a given wavelength. Thus, by illuminating the sample 20 with waves of different lengths, as many images 41 are obtained as there are exposure wavelengths. The incident exposure waves having different wavelengths can be emitted simultaneously or successively on the sample 20.

For example, provision can be made for one grating to have a pitch adapted for infrared wavelengths and another grating to have a pitch adapted for ultraviolet wavelengths. Then, this allows a chemical analysis according to the molecular absorption of the constituent components of the particles 21 of the sample 20. The image of the digitally reconstructed object will have a variation in intensity depending on the light absorption specific to the chemical composition of the analysed particle 21. It is also possible to provide a larger number of gratings 32. It is possible, for example, to provide on the same support 30 at least three gratings, including for example:

a grating 32a adapted to the wavelengths of the blue colour, the pitch Pa of this grating will be, for example, 450 nm, a grating 32b adapted to the wavelengths of the green colour, the pitch Pb of this grating will be, for example, 600 nm, a grating 32c adapted to the wavelengths of the red colour, the pitch Pc of this grating will be, for example, 750 nm.

According to a first embodiment, the support 30 comprises several gratings which are distinct from one another. These gratings do not overlap. They occupy distinct areas of the support 20. This embodiment will be detailed with reference to FIGS. 10A to 11C. Another embodiment wherein the different gratings partially or entirely overlap will be detailed with reference to FIGS. 12A to 12C.

Figure 10A:
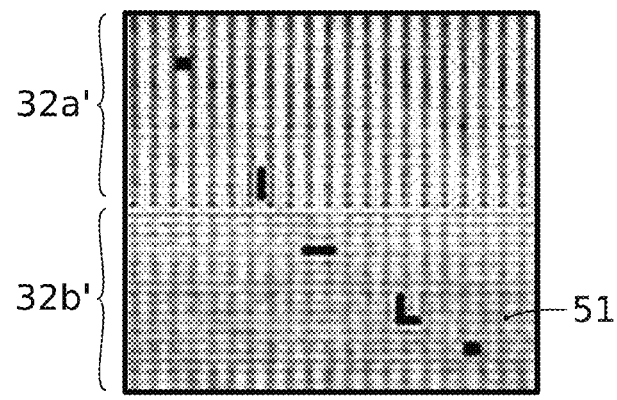
FIGS. 10A to 10E illustrate a detection device comprising two separate periodic gratings as well as the results obtained with this device.
Figure 10B:
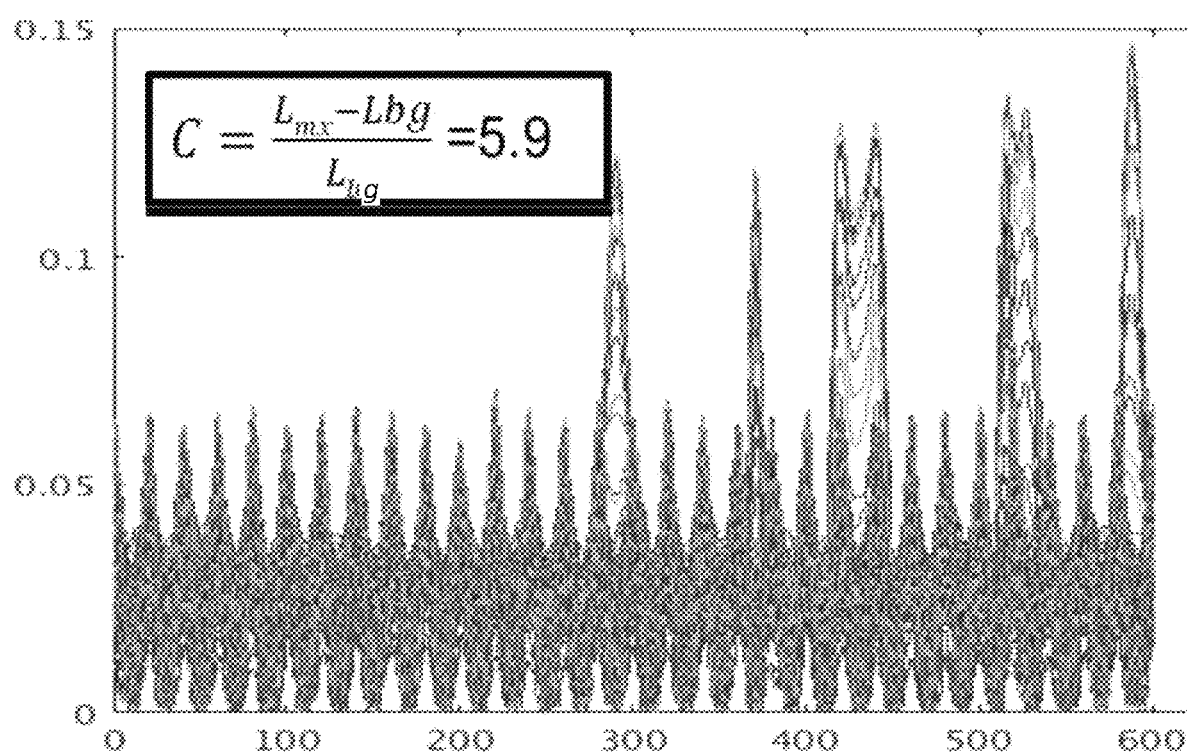
Figure 10C:
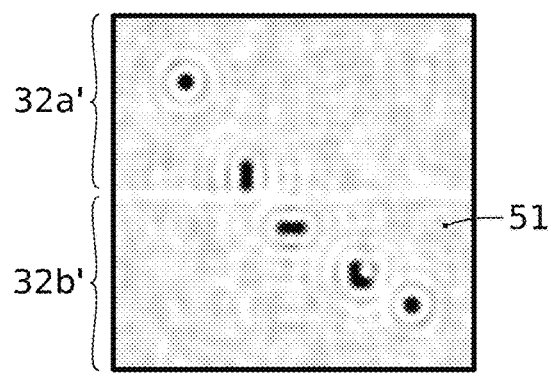
Figure 10D:
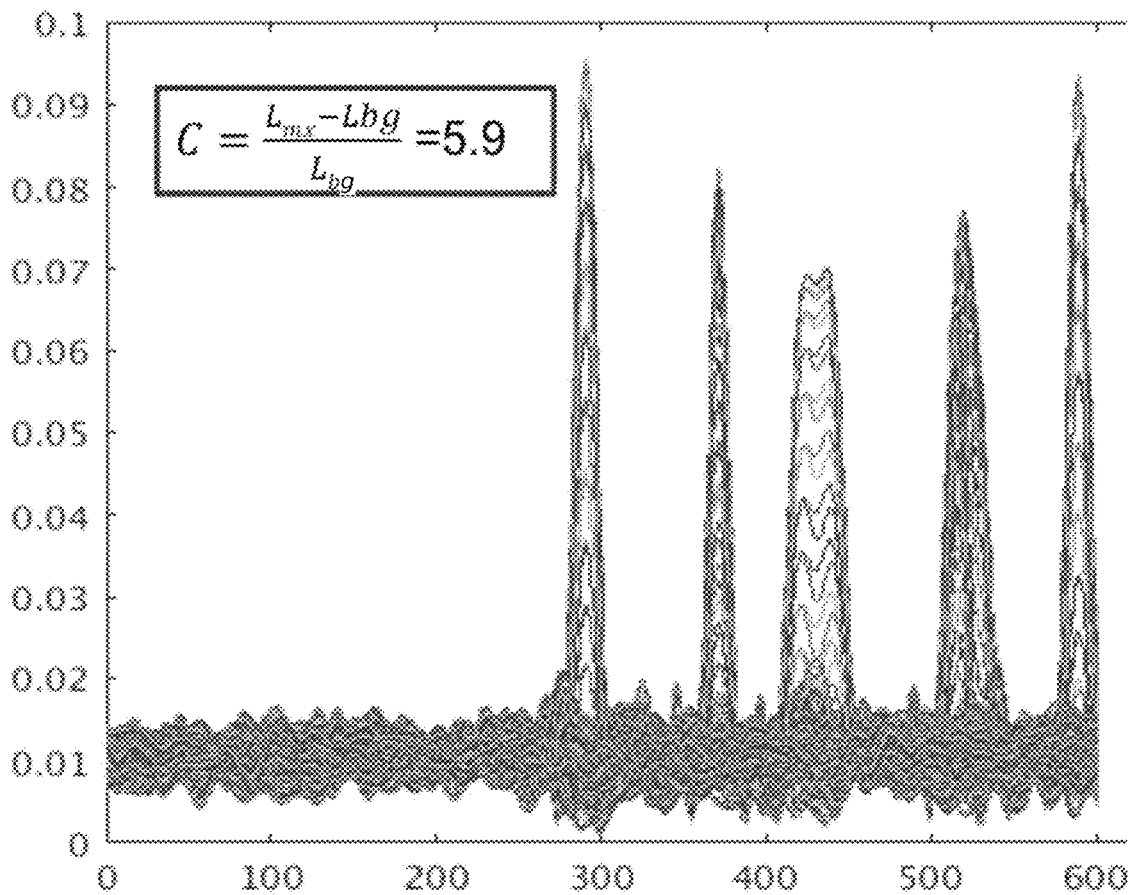
Figure 10E:
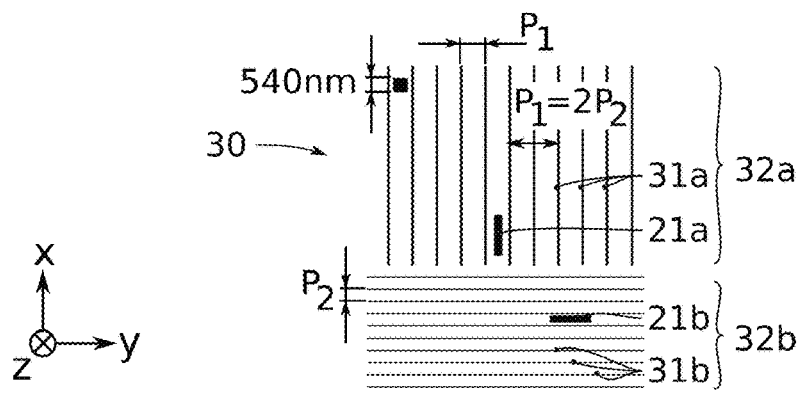

A first example of a support comprising separate gratings is illustrated with reference to FIGS. 10A to 10D. The support 30 comprises a first grating 32a and a second grating 32b, as shown in FIG. 10E.

The first grating 32a includes patterns 31a forming parallel lines, extending vertically (x) and distributed periodically at a pitch P1. The second grating 32b includes patterns 31b forming parallel lines, extending horizontally (y) and distributed periodically at a pitch P2≠P1. In this example, Pb=2 Pa. The exposure wavelengths of the sample 20 are respectively $\lambda a$=450 nm and $\lambda b$=900 nm. Z1=1 cm. The sample 20 includes in particular the particle 21a located on or facing the grating 32a and the particle 21b located on or opposite the grating 32b. These particles 21a, 21b, are here rectangles whose dimensions, in projection on a plane parallel to the plane xy, are equal to 1.53 µm*0.27 µm.

By exposing the sample 20 simultaneously or successively with incident waves of wavelengths $\lambda a$ and $\lambda b$, two images or holograms 41 are obtained. FIGS. 10A and 10B illustrate the reconstructed object 50 by exposure to wavelength $\lambda a$. The contrast obtained is 5.9. FIGS. 10C and 10D illustrate the reconstructed object 50 by exposure to wavelength $\lambda b$. The contrast obtained is 5.9. Areas 32a' and 32b' which correspond to the 2 gratings 32a, 32b of the support 30 are seen on the images 50 which are digitally reconstructed, and illustrated in FIGS. 10A and 10C.

Figure 11A:
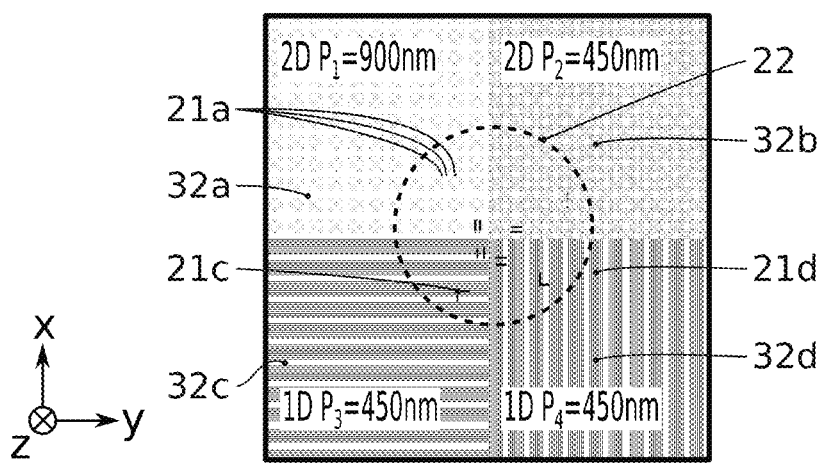
FIGS. 11A to 11C illustrate the results obtained with a detection device comprising four distinct periodic gratings.
Figure 11B:
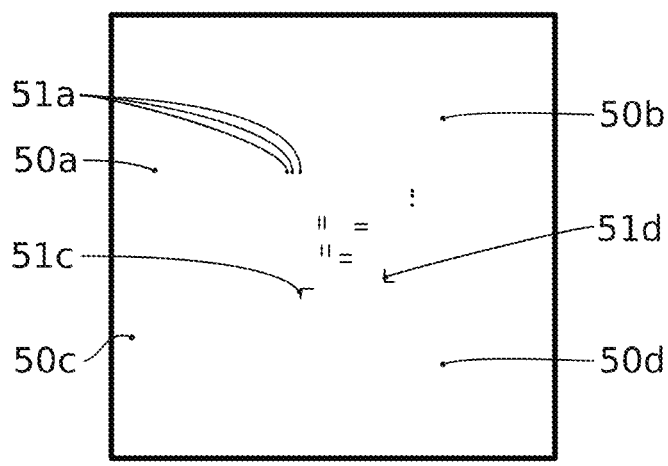
Figure 11C:
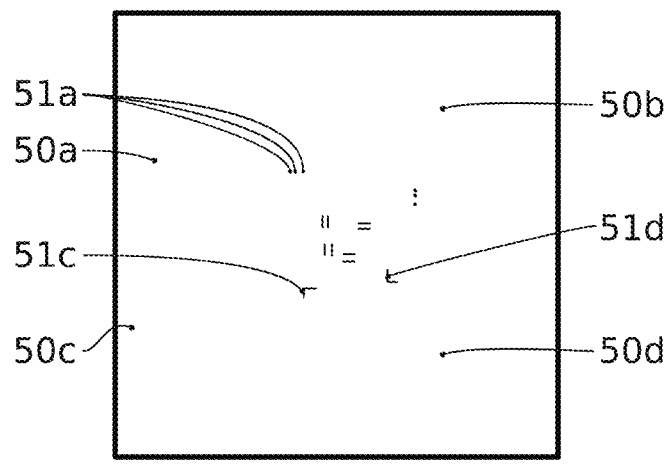
Figure 12A:
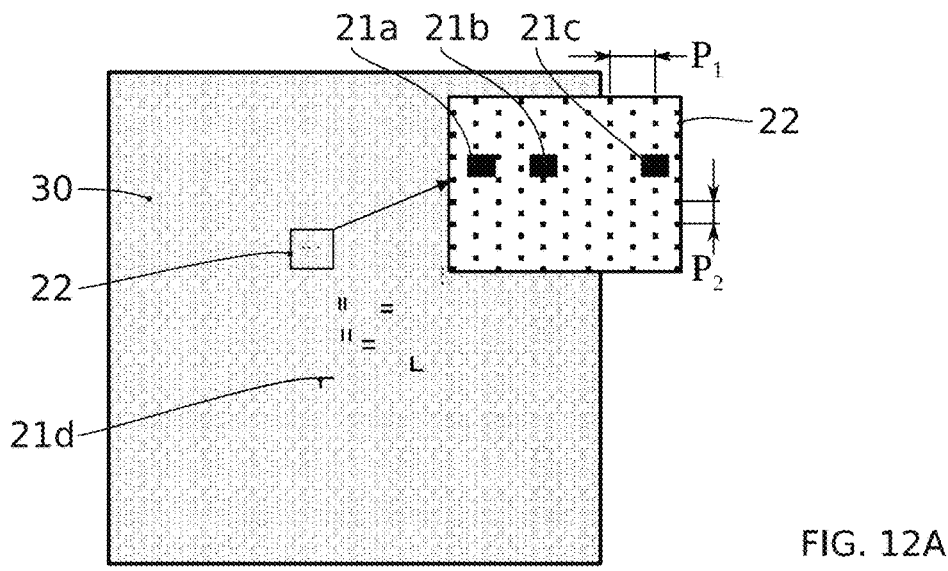
FIGS. 12A to 12C illustrate a detection device comprising two interlaced periodic gratings as well as the results obtained with this device.

A second example of support 30 comprising separate gratings is illustrated in FIGS. 11A to 11C. The support 30 comprises four gratings 32a, 32b, 32c, 32d. Here, each grating occupies a quarter of the surface area of the support 30.

The analysed scene 22 includes the particles 21a-21d which are distributed facing the gratings of the support 30.

In this non-limiting example, the support 30 includes two 2D gratings and two 1D gratings. More specifically, in this example:

the grating 32a is a 2D grating, in the form of a matrix, whose pitch Pa=$\lambda a$=900 nm, the grating 32b is a 2D grating in the form of a matrix, whose pitch Pb=$\lambda b$=450 nm, the grating 32c is a 1D grating, formed of horizontal strokes (axis y) distributed periodically according to a pitch Pc=$\lambda c$=450 nm, the grating 32d is a 1D grating, formed of vertical strokes (axis x) distributed periodically according to a pitch Pd=$\lambda d$=450 nm.

In this example, as in the previous examples, the critical dimensions of the sample 20 are comprised between 280 and 336 nanometres. The distance Z1 between the support 32 and the image sensor 40 is equal to 1 cm.

FIG. 11B corresponds to the image 50 of the object digitally reconstructed when the source 10 emits an incident wave of wavelengths $\lambda$=$\lambda b$=$\lambda c$=$\lambda d$=450 nm. FIG. 11C corresponds to the object digitally reconstructed when the source 10 emits an incident wave of wavelengths $\lambda$=$\lambda a$=900 nm.

As indicated above, the gratings can, according to another embodiment, completely or partially overlap. Such an example will now be described with reference to FIGS. 12A to 12D.

In this example, two gratings are entirely interlaced. They occupy the same area of the support 30. In this example, there are two gratings of point patterns. These two gratings are interlaced. A first grating has a pitch Pa=$\lambda a$=450 nm and a second grating has a pitch Pb=$\lambda b$=900 nm. In this example, Z1=1 cm.

Figure 12B:
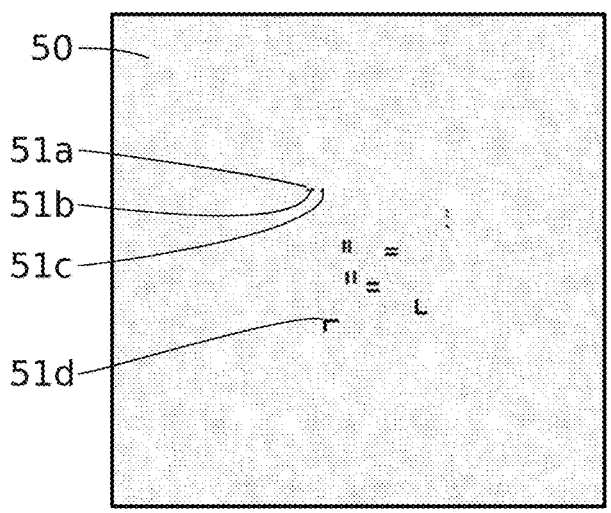
Figure 12C:
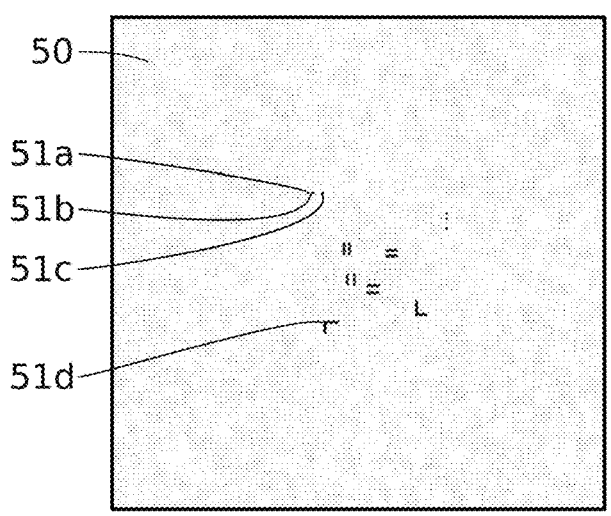

FIG. 12B corresponds to the object digitally reconstructed when the source 10 emits an incident wave of wavelengths $\lambda$=$\lambda a$=450 nm. FIG. 12C corresponds to the object digitally reconstructed when the source 10 emits an incident wave of wavelength $\lambda$=$\lambda b$=900 nm. The images 51a-51d of the particles 21a-21d are very easily identifiable.

FIGS. 13A to 15C illustrate the influence of the size of the pixel matrix of the sensor 40 collecting the exposure wave 14 propagating from the sensor 40. Indeed, the larger the size of the pixel matrix (and therefore of the sensor), the more light and information it senses on the object.

In these examples, Z1=1cm and $\lambda$=450 nm. The support 30 is identical to that of FIGS. 12A to 12C. Thus, the support 30 includes two interlaced gratings 32, formed of point patterns. Typically, the pitches of each of the gratings are 450 and 900 nm.

Figure 13A:
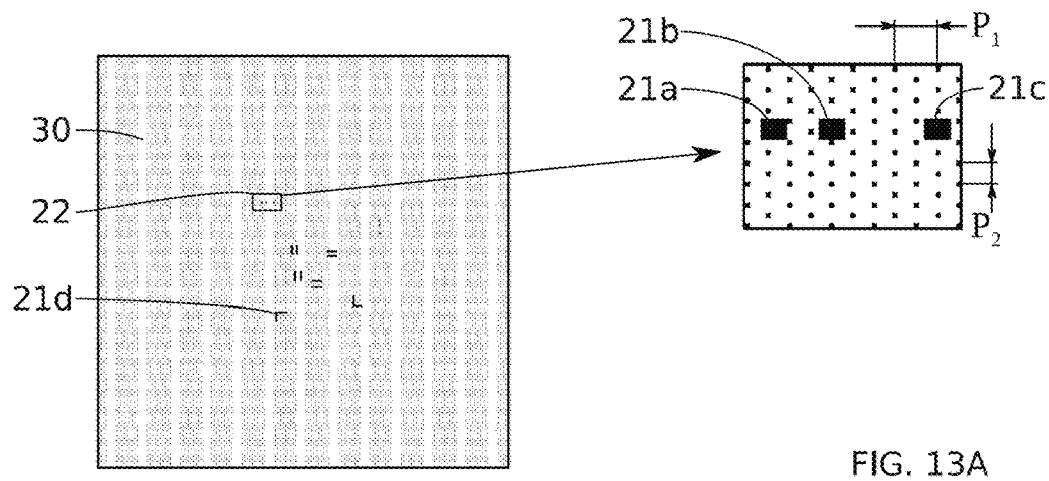
FIG. 13A illustrates a holographic image obtained with a device whose image sensor has a certain dimension.
Figure 14A:
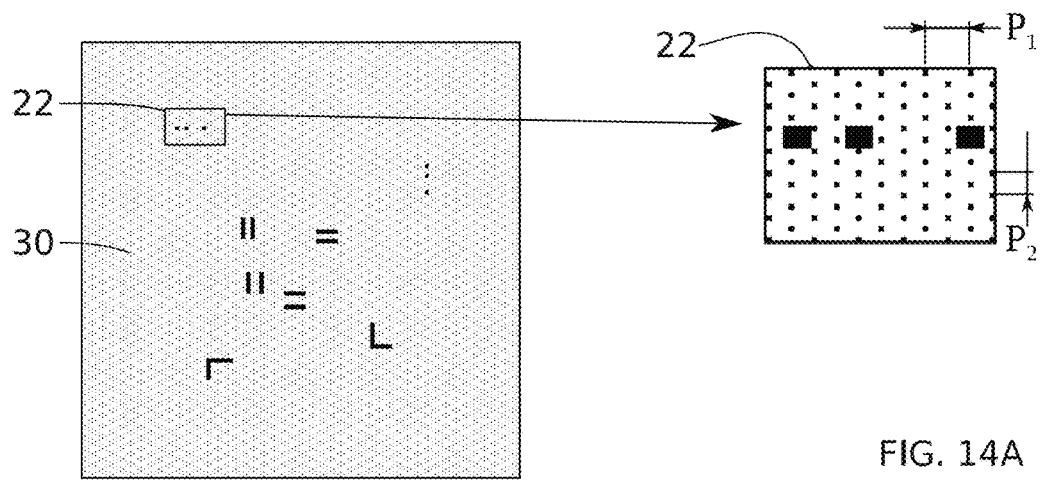
FIG. 14A illustrates a holographic image obtained with a device whose image sensor has dimensions different from those of the image sensor of FIG. 13A.
Figure 15A:
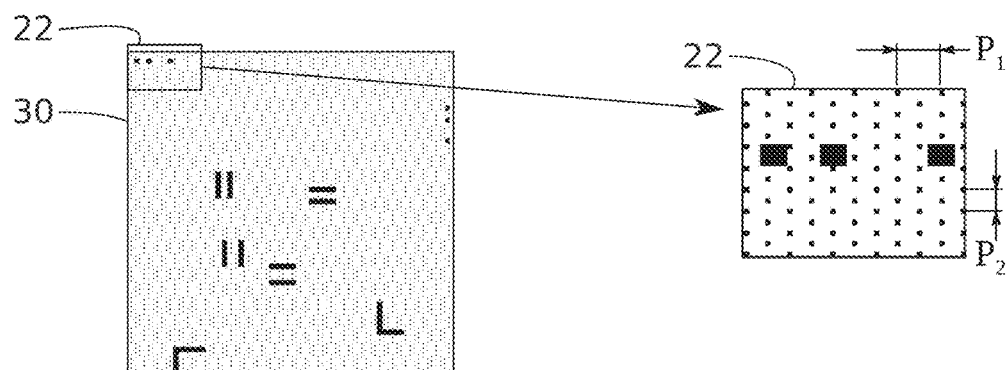
FIG. 15A illustrates a holographic image obtained with a device whose image sensor has dimensions different from those of the image sensors of FIGS. 13A and 14A.

The sample 20 is identical for each of these figures. FIGS. 13A, 14A and 15A illustrate the images 41 generated by the sensor 40, that is to say the holograms.

In each of these examples, the sensor 40 is a square matrix of pixels, the length of one side of which is L and including a number of pixels per line equal to Nbpix.

Figure 13B:
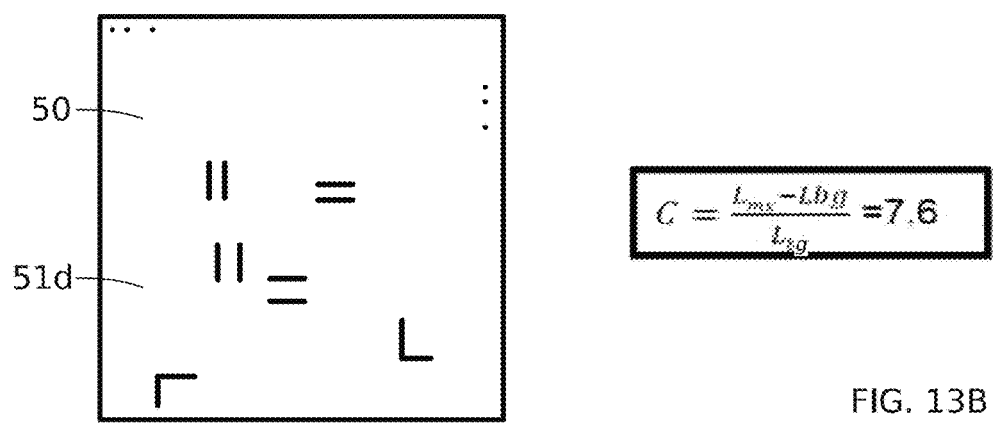
FIGS. 13B and 13C show the results obtained by digital reconstruction of the holographic image of FIG. 13A.
Figure 13C:
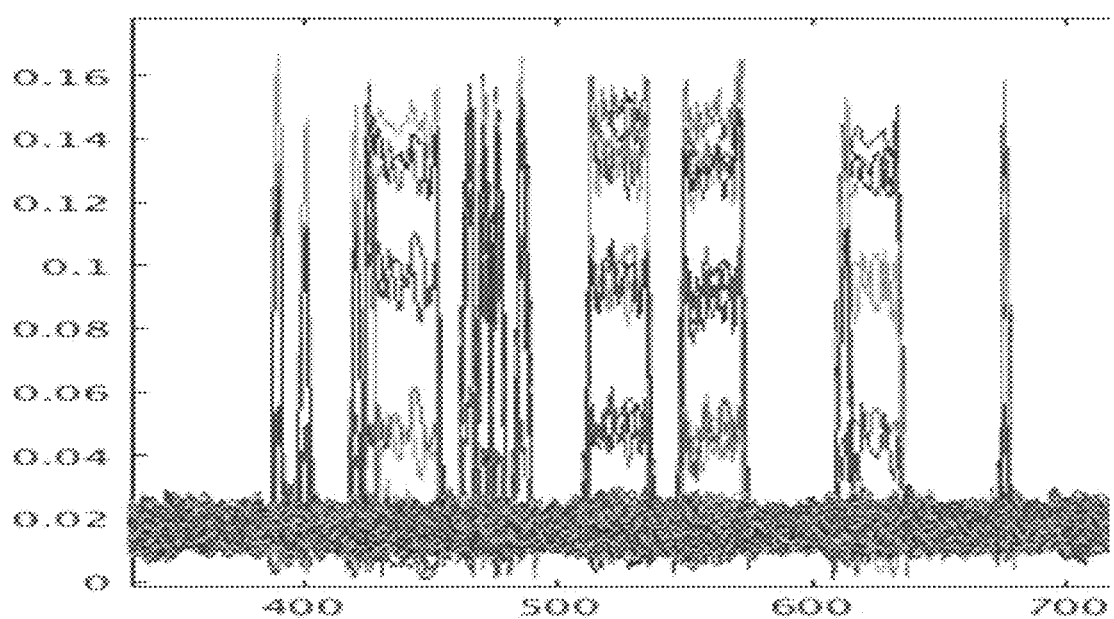

In the first example, illustrated in FIG. 13A, L=112.52 µm and Nbpix=1000. The digitally reconstructed image 51 is illustrated in FIG. 13B. The contrast obtained is equal to 7.6. The light intensity as a function of the position of the pixels is illustrated in FIG. 13C.

Figure 14B:
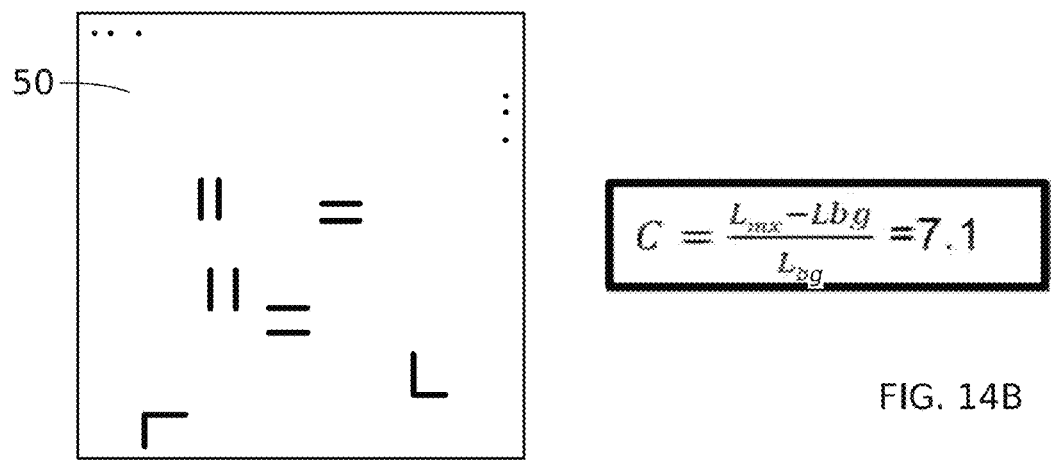
FIGS. 14B and 14C show the results obtained by digital reconstruction of the holographic image of FIG. 14A.
Figure 14C:
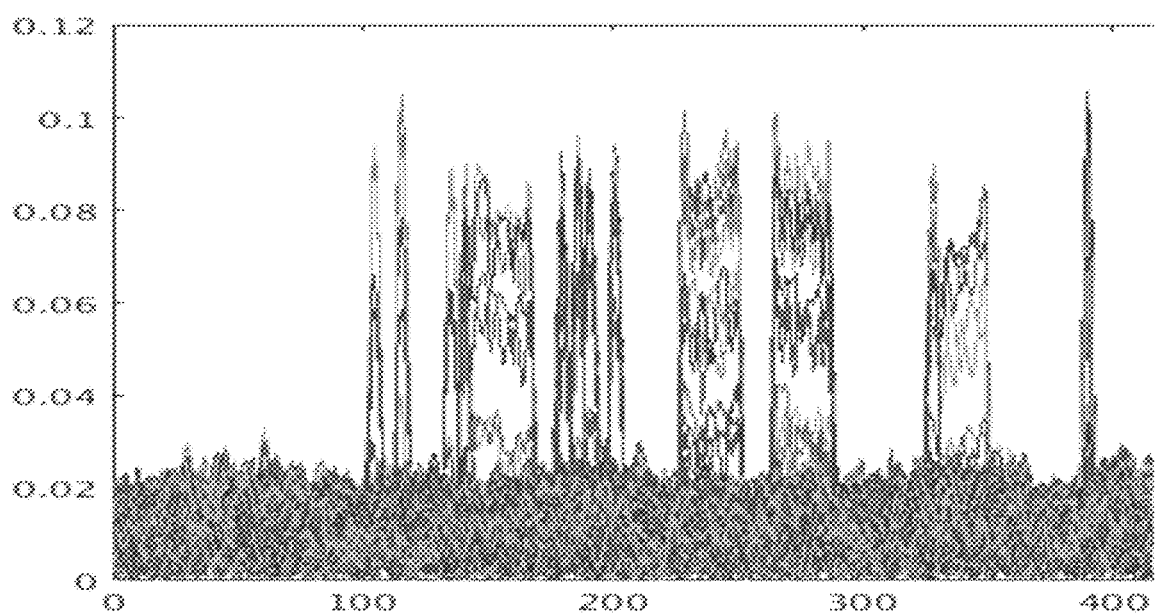

In the second example, illustrated in FIG. 14A, L=56.26 µm and Nbpix=500. The digitally reconstructed image 51 is illustrated in FIG. 14B. The contrast obtained is equal to 7.1. The light intensity as a function of the position of the pixels is illustrated in FIG. 14C.

Figure 15B:
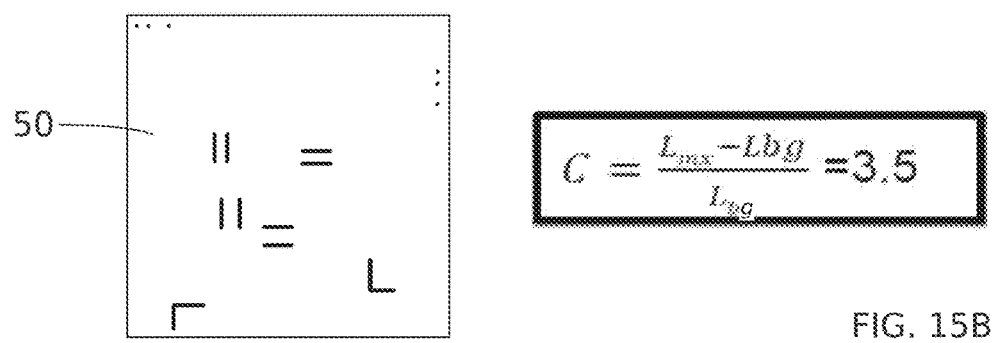
FIGS. 15B and 15C show the results obtained by digital reconstruction of the holographic image of FIG. 15A.
Figure 15C:
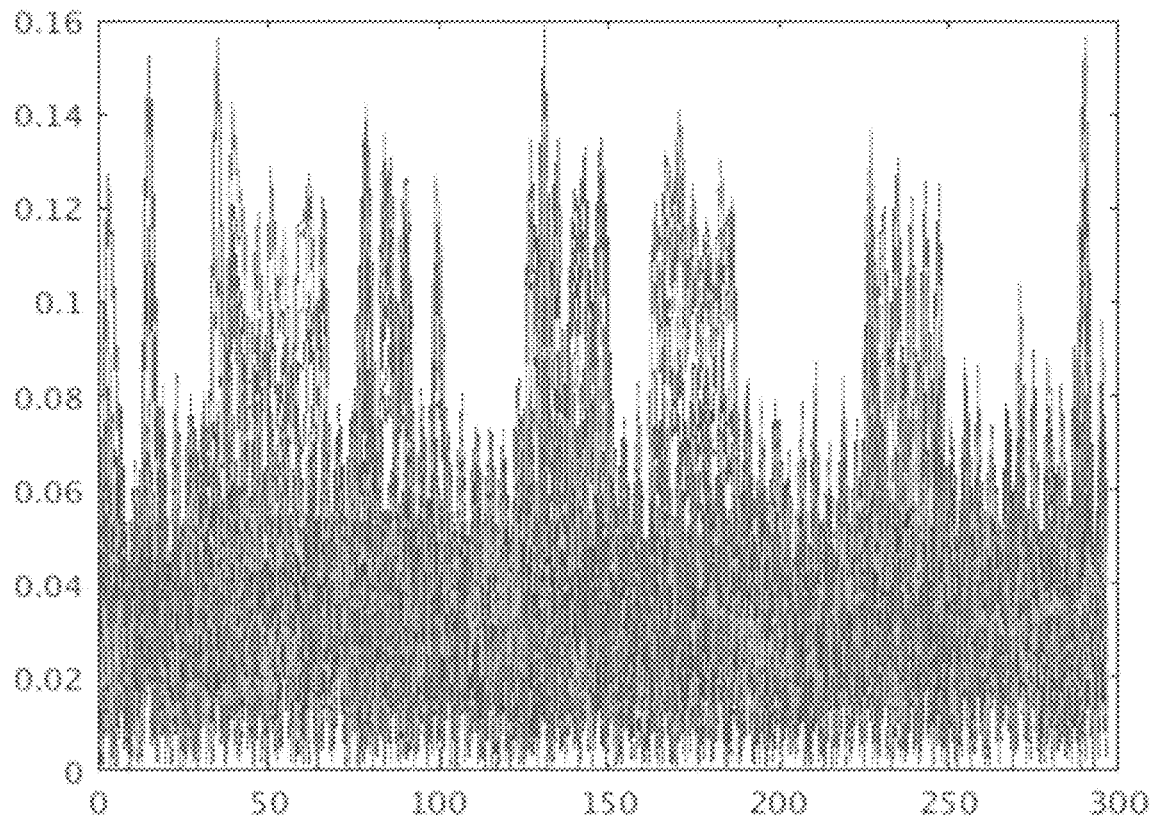

In the third example, illustrated in FIG. 15A, L=28.13 µm and Nbpix=300. The digitally reconstructed image 50 is illustrated in FIG. 15B. The contrast obtained is equal to 3.5. The light intensity as a function of the position of the pixels is illustrated in FIG. 15C.

It is clear from these examples that the object, respectively image field, defined by all the points of the object traversed by the incident light rays, has an impact, through its lateral dimension, on the resolution and the contrast of the reconstructed image from the hologram 41. The larger the sensor 40, the higher the contrast and the signal-to-noise ratio.

According to one embodiment, the patterns 31 of the grating 32 are heat conducting elements or heat producing elements. In the first case, the patterns can be metallic. They can be made entirely or partially of tungsten. Their temperature rises and releases heat when they are in conduction with a heat source. In the second case, provision can be made, for example, for the patterns to be resistive elements which generate heat when power supplied.

In these two embodiments, it is then possible to heat the grating 32. This allows to destroy some particles which have an evaporation or melting temperature lower than the temperature generated by the grating 32. This is the case with organic particles. Grating heating 32 thus eliminates these fusible particles without degrading other particles which are not fusible or are fusible at a higher temperature.

Typically, this allows to remove the organic particles without degrading metal particles. It is then possible to differentiate these particles by performing successive recordings of holograms. Some holograms are recorded without the application of heat by the grating 32, which allows to identify organic particles and potentially other particles such as metallic particles. Other holograms are recorded with the application of heat through the grating 32, which allows to identify only inorganic particles.

Another advantage related to the heating of the diffracted structure is that it is possible to degrade and eliminate the particles which would be caused to stick to the grating 32. Thus, this allows to avoid the accumulation of particles on the grating 32 by cleaning it. This feature thus responds to the problem of extending the service life of the device and maintaining its sensitivity over a long period of time.

Typically, the device is configured so that the grating 32 reaches a temperature of several hundred degrees, typically at least 150° C. and preferably at least 300° C., preferably at least 500° C. and preferably at least 1000° C. If the materials allow it, it is possible to go beyond 1500° C., or even beyond 1700° C., or even at or beyond 2400° C.

For example, a quartz support with a metal MoSi2 grating allows to reach 1800° C. in air, without damaging the electrodes. Moreover, the temperature can reach 1700° C. or even 2400° C. for refractory metals such as molybdenum or tungsten. The person skilled in the art will be able to use alloys such as molybdenum disilicide MoSi2 or silicon carbide SiC, in particular because of a lower cost.

The examples described above clearly show that the invention is particularly effective for counting and analysing particles of very small size, that is to say the size of which is less than or of the order of the wavelength.

Figure 16A:
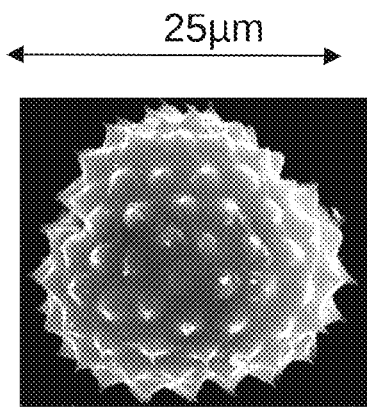
FIGS. 16A to 16C are photos, taken by scanning electron microscope, of several objects to be analysed.
Figure 16B:
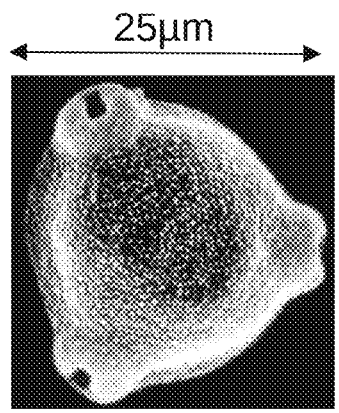

Moreover, the invention also proves to be very useful for carrying out the morphological identification of larger objects. This is the case with pollens or mould. Indeed, with the holographic imaging solutions of the prior art, it is possible to count objects such as pollen. However, it is not possible to distinguish between the different types of pollen. For example, the known solutions do not allow to distinguish ragweed pollen from birch pollen. FIGS. 16A and 16B are photos obtained with a scanning electron microscope (SEM) for each of these pollens respectively. These pollens substantially have the same size: 25 μm. The known solutions do not allow to differentiate these pollens by holographic imaging. Consequently, in practice, one usually proceeds with taking a sample, then performing a SEM photograph, then counting each of the particles from that photograph. This method is naturally long and tedious. Moreover, it makes it impossible to count these pollens in real time or continuously. It is therefore not possible to analyse a flow potentially containing these pollens.

On the contrary, the detection device described above allows to digitally reconstruct an image with a sufficiently good resolution to identify the nature of each of these pollens.

Figure 16C:
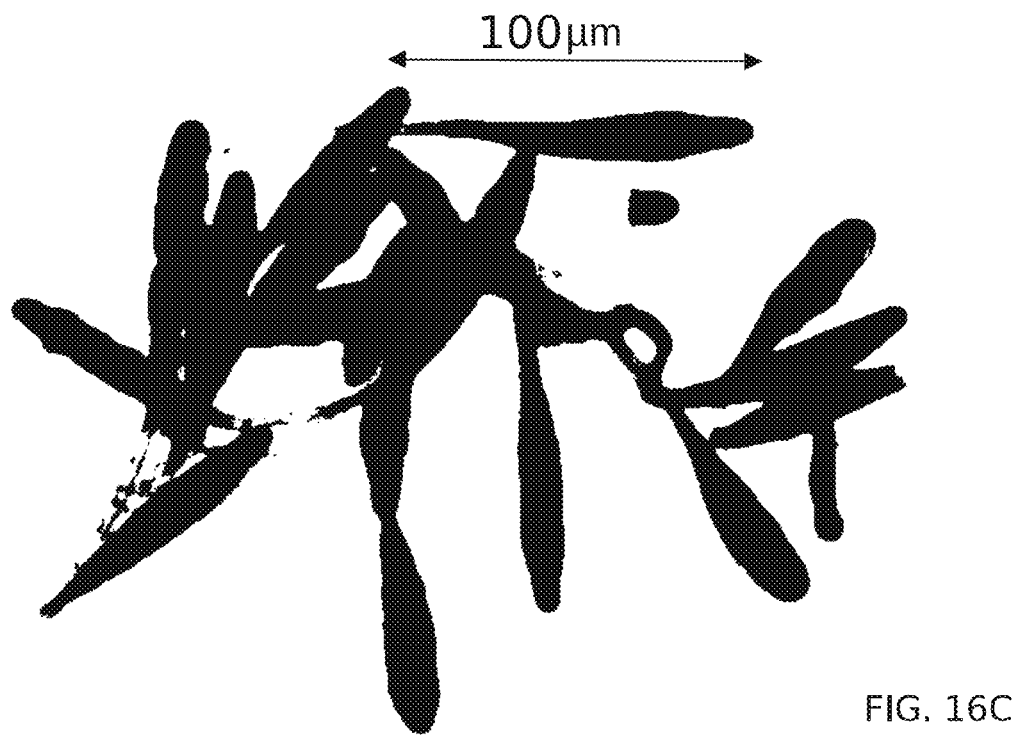

Moreover, this device allows to identify objects, sometimes large in size, which are difficult to recognise using the usual techniques. This is the case, for example, with conidiophore mould, the size of which is several hundred micrometres, and an example of which is illustrated in FIG. 16C.

Figure 17:
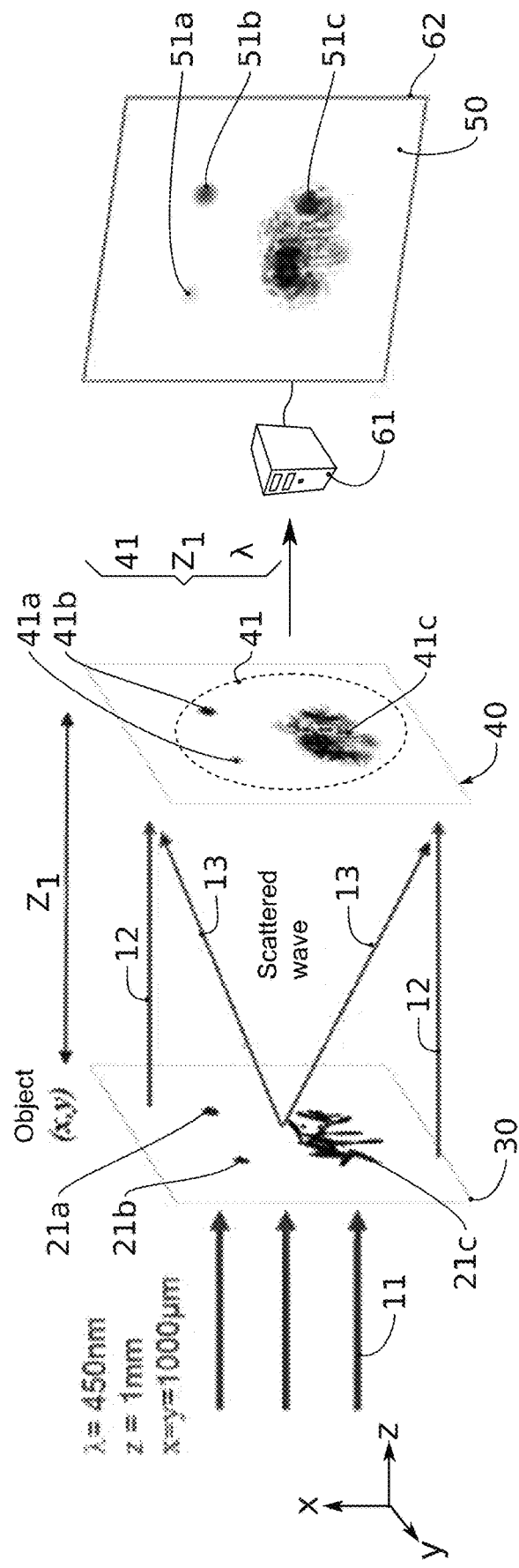
FIG. 17 schematically illustrates a device according to the prior art used to analyse the objects of FIGS. 16A to 16C.

FIG. 17 illustrates a holographic imaging device, similar to prior art solutions and used to analyse a sample comprising ragweed pollen 21a, birch pollen 21b and conidiophore mould 21c. In this example, Z1=1 mm, λ=450 nm. The imager of the sensor 40 is a square with sides measuring 1000 μm.

In this example, the support 30 does not have a diffracted grating. The object 51 digitally reconstructed from the hologram 41 does not allow to recognise each of these particles. Indeed, this digitally reconstructed object 51 does not allow to obtain a higher resolution than that of the hologram 41 itself.

Figure 18A:
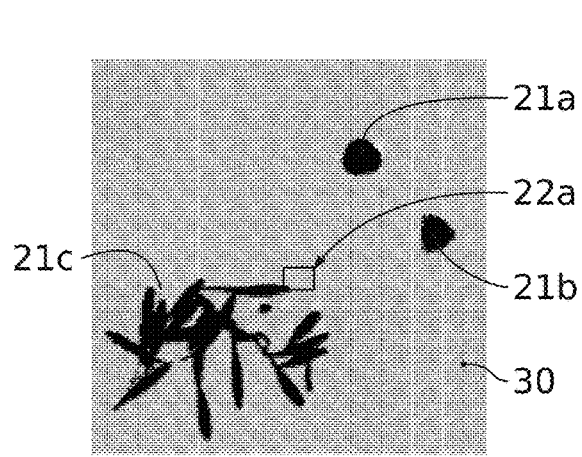
FIGS. 18A to 18D illustrate a detection device according to the invention comprising two diffraction gratings as well as the results obtained with this device for analysing the objects of FIGS. 16A to 16C.
Figure 18B:
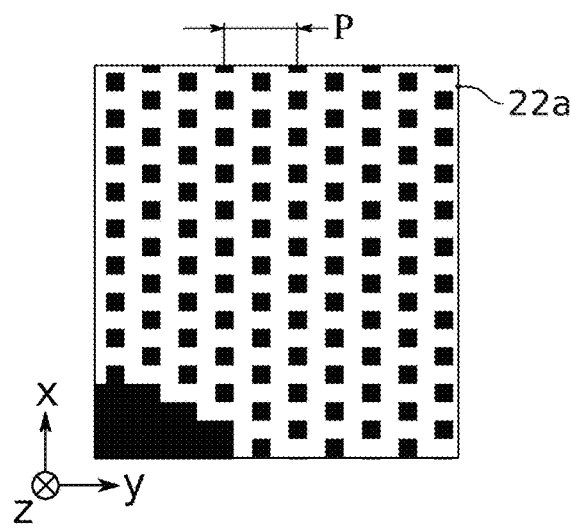

A completely different result is obtained by analysing this same sample 20 using a device according to the invention. This device comprises a support 30 having two interlaced gratings. Each grating has point patterns, for example pads of circular, polygonal, rectangular or square section. The pitch Pa of a first grating is equal to 500 nm, measured in a vertical direction (x). The pitch Pb of a second grating is equal to 1000 nm, measured in a horizontal direction (y). The support 30 and the particles 21a-21c are illustrated in FIG. 18A, FIG. 18B being an enlargement of the portion 22a of the sample. The pixel matrix of the sensor 40 forms a square with a side of 250 μm and includes 1000 pixels per line.

Figure 18C:
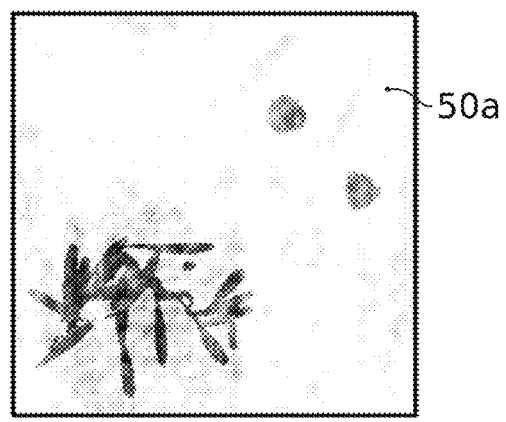
Figure 18D:
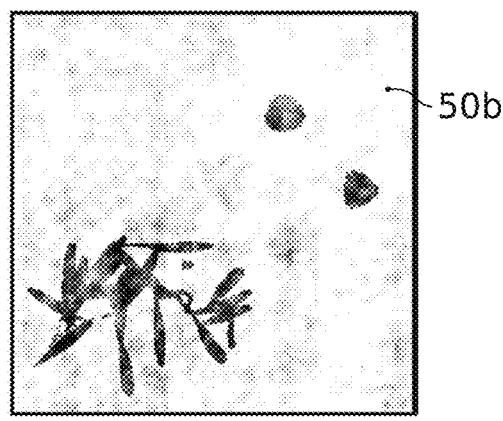

By exposing the sample with an incident wave of wavelengths λa=500 nm, a digital reconstruction 50a of the hologram is obtained. This result is illustrated in FIG. 18C. By exposing the sample with an incident wave of wavelengths λb=1000 nm, a digital reconstruction 50b of the hologram is obtained. This result is illustrated in FIG. 18D. On each of these digitally reconstructed images 50a, 50b, the resolution is largely sufficient to recognise the nature of each of these particles 21a-21c.

This example clearly shows that the device according to the invention is very effective for the identification and morphological analysis of objects whose size is greater than the exposure wavelength.

The invention also finds a particularly advantageous application, in the counting, the identification of very small particles such as macromolecules like DNA.

To produce a detector whose diffraction grating 32 is adapted for this particle size, provision can be made for this grating to be formed by the atoms of a lattice. Preferably, it is a crystal lattice, which is advantageously monocrystalline. This crystal lattice is, for example, a lattice of silicon atoms. A crystal layer of silicon forms a face-centred cubic lattice (fCC). The period of a silicon fCC lattice is equal to the length I of one side of the cube and is equal to 3.11 angstroms (3.11 $10^{-10}$ m). Such a grating is illustrated in FIG. 19B.

According to an advantageous embodiment, the grating 32 is formed by a thin layer of monocrystalline silicon forming a membrane.

To form a <100> silicon membrane, reference may for example be made to the following publications:

U.S. Pat. No. 8,501,026, entitled "Method for Making a Planar Membrane", issued Aug. 6, 2013 and mentioning as inventors Christophe Constancias and al.

"Fabrication of large area ultrathin silicon membrane: Application for high efficiency extreme ultraviolet diffraction gratings", Constancias and al. J. Vac. Sci. Technol. B 281, January/February 2010.

Fabrication of Buckling Free Ultrathin Silicon Membranes by Direct Bonding with Thermal Difference Florian Delachat, Christophe Constancias, Frank Fournel, Christophe Morales, Boris Le Drogoff, Mohamed Chaker, and Joelle Margot, ACS Nano, Just Accepted Manuscript DOI: 10.1021/acsnano.5b00234•Publication Date (Web): 19 Mar. 2015.

Figure 19A:
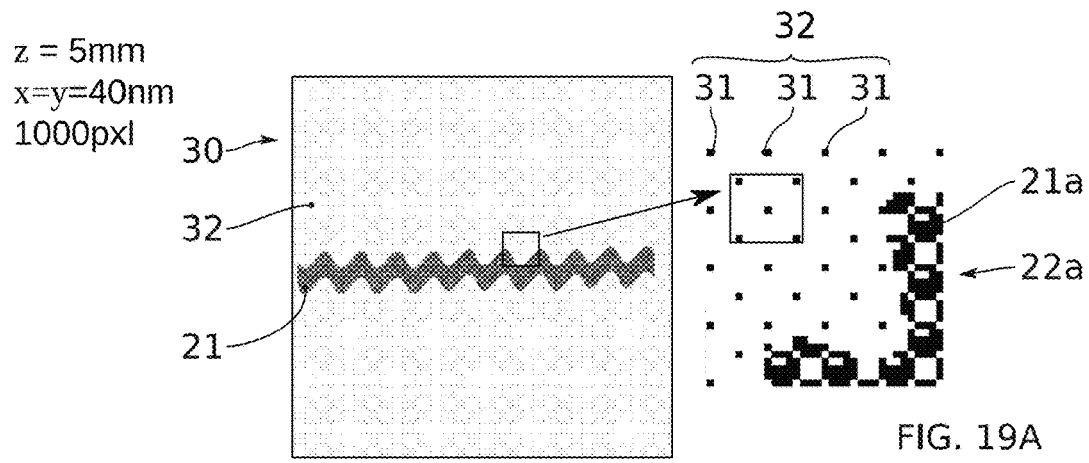
FIGS. 19A to 19C illustrate another detection device according to the invention as well as the results obtained with this device for analysing a DNA strand.
Figure 19B:
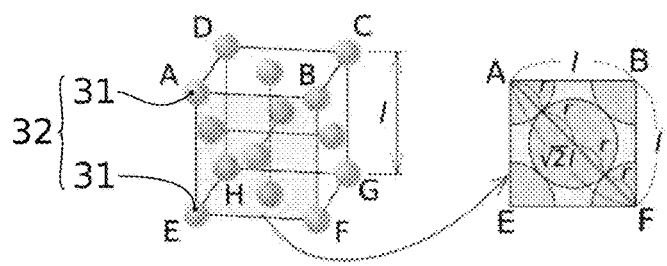

FIG. 19A shows the support 30 carrying such a grating 32. An enlarged portion 22a illustrates in detail the patterns 31 of the grating 32 as well as a portion of an object to be analysed. This object is here a DNA strand 21. In this symbolic representation, the DNA strand has a radius of 2 nanometres and a pitch of 3.4 nanometres.

Figure 19C:
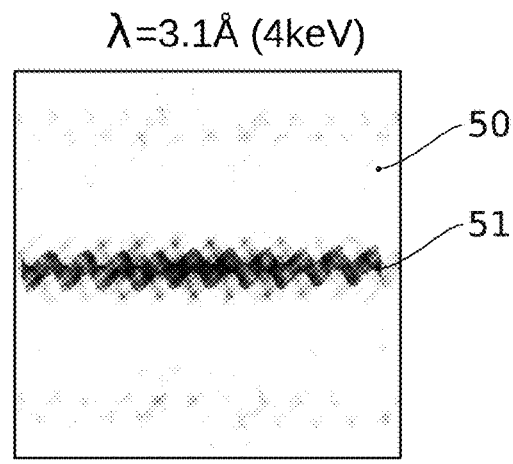

The DNA helix 21 is exposed to an incident wave, the wavelength of which is 3.11 angstroms, that is to say approximately equal to the pitch of the grating 32. The recombination of the incident wave 12 from the source 10 and propagating through the structure 30 with the diffracted wave 13 by the DNA helix 21 and also propagating through the structure 30 forms a holographic image 41 on the sensor 40. The result 50 of the digital reconstruction of this hologram 41 is illustrated in FIG. 19C.

It can be seen, in this image 50, that it is possible to accurately analyse the DNA helix 51. In particular, the radius and the pitch of this helix can be measured.

Figure 20A:
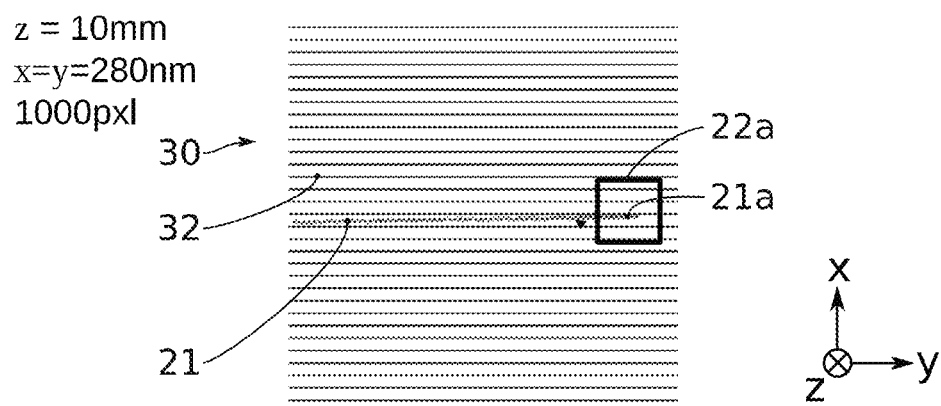
FIGS. 20A to 20C illustrate another detection device according to the invention, comprising a one-dimensional grating, as well as the results obtained with this device for analysing a DNA strand.
Figure 20B:
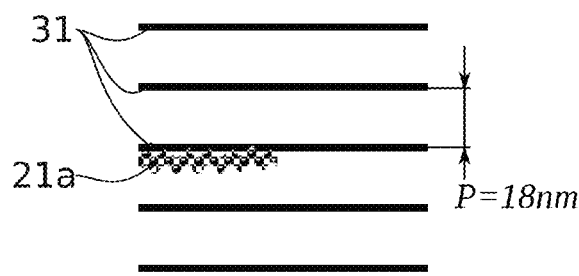
Figure 20C:
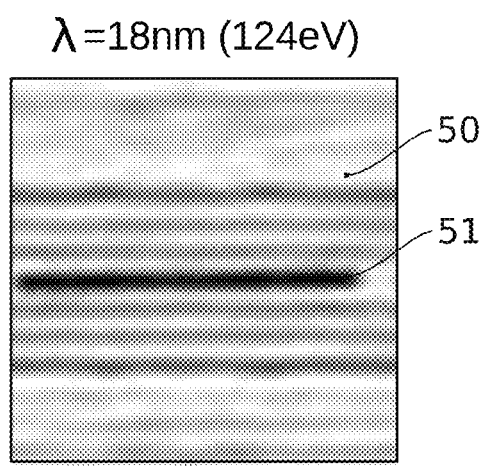

FIGS. 20A to 20C illustrate an embodiment of a device comprising a structured grating, particularly well adapted to the analysis of small objects and extending mainly in a single direction. This is the case, for example, with a macromolecule such as DNA. In this example, the DNA strand forms a helix whose length is equal to 253 nanometres, the radius is equal to 2 nanometres, the pitch is equal to 3.4 nanometres.

For this purpose, a grating of parallel lines can be structured so that the object to be analysed is placed between two parallel lines. The position of the object can thus be precisely controlled. Moreover, this allows to control this position when handling or transporting the device containing the sample to be analysed.

In order to produce such a grating, it is possible, for example, to use nanometric lithography techniques such as electron beam lithography (Ebeam), lithography by self-organisation of block copolymers, a technique usually qualified by the acronym DSA (Directed Self-Assembly). To date, the smallest period to achieve periodic gratings in lithography ring is of 18 nanometres or even 10 nanometres.

For gratings whose sizes are slightly larger, recourse can be made to conventional lithography techniques and, in particular, to nanoimprinting techniques which allow to obtain high resolutions, of the order of a few tens of nanometres.

In the example illustrated in FIG. 20A and an enlarged portion 22a of which is illustrated in FIG. 20B, the diffraction grating 32 of the support 30 has patterns in parallel lines extending in the direction y.

In this non-limiting example, the pitch P of the grating 32 is of 18 nanometres. The support 30 has a square shape the length of one side of which is 280 nanometres. The distance Z1 between the support 30 and the image sensor 40 is 10 millimetres. The image sensor 40 comprises 1000 pixels per line.

With this device, by emitting an incident wave whose wavelength λ is close to the pitch of the grating 32, that is to say 18 nanometres in this case and with an energy of 124 eV, a hologram is obtained on the image sensor 40. The object 50 digitally reconstructed from this hologram is shown in FIG. 20C. In this figure, the DNA helix 51 can be clearly seen. It is possible to easily measure its length. On the other hand, in order to precisely measure the radius and the pitch of this helix 51, it would be necessary to have a source allowing to emit a wave the wavelength of which would be less to approximate the critical dimension, here the radius of the DNA helix 51.

By way of non-limiting example, for this purpose, it is possible to use systems whose sources of a few kev are metal anodes bombarded by electrons. The anodes made of transition metals such as Co, Cu, Ga, Mo, Ag produce X-rays from 6 to 22 keV. It is also possible to use synchrotron sources which allow to produce any type of X-ray.

Figure 21:
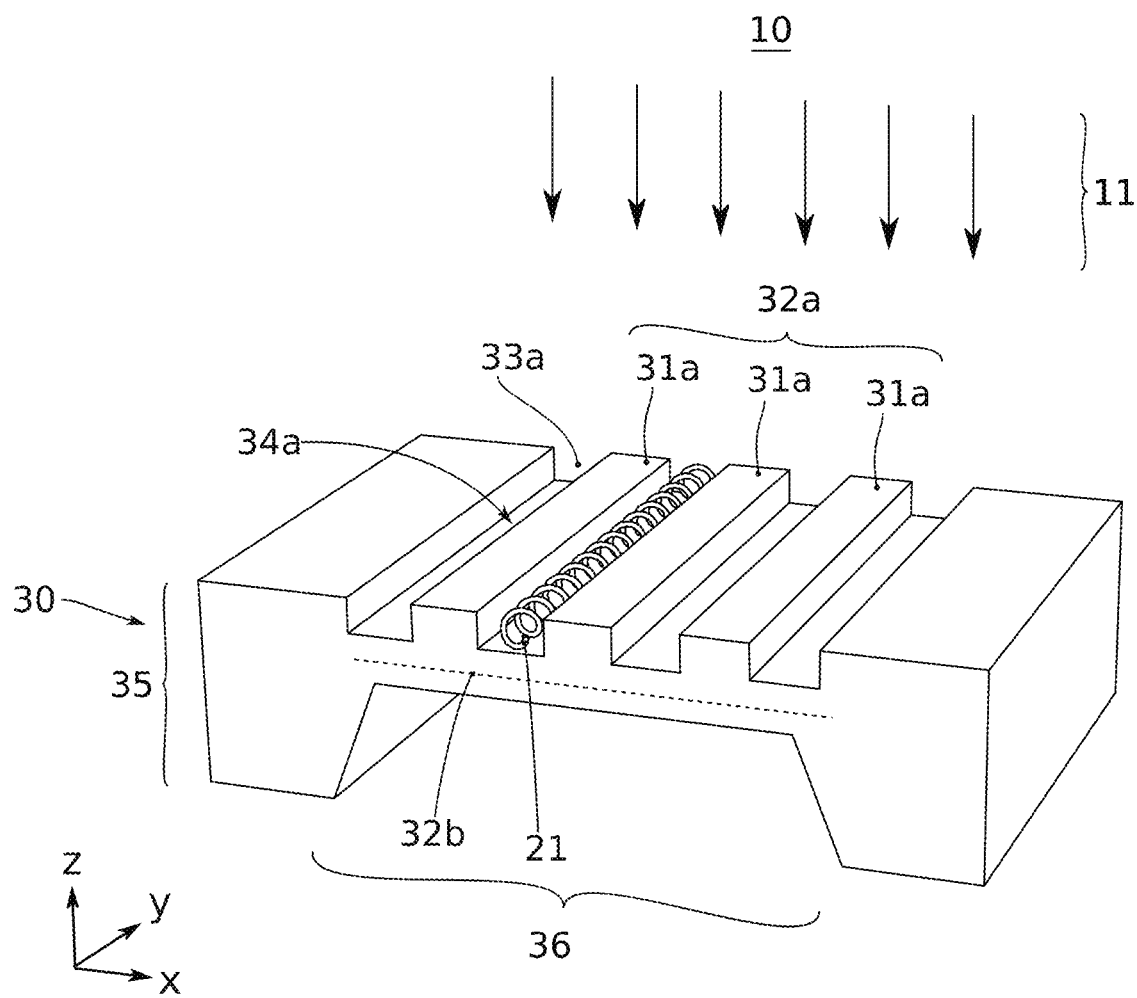
FIG. 21 schematically illustrates a structured support for a detection device according to the invention.

FIG. 21 illustrates, in a simplified manner, a support 30 comprising a layer 35, a portion 36 of which is sufficiently thin (along the axis z) to allow an incident wave 11 to pass therethrough. This portion 36 is structured so as to form a diffraction grating 32a. This grating 32a comprises trenches 33a, separated from each other by patterns 31a in relief forming ribs. The trenches 33a and the ribs are disposed alternately and extend parallel to each other in the direction y. The bottom 34 of the trenches 33a can be used to receive an object such as a DNA strand 21. This support 30 is exposed to an incident wave 11.

This embodiment allows to confine the object to be analysed and to keep it in place during a handling or a transport. Moreover, the grating 32a has a diffraction function in addition to its function of maintaining the DNA strand. More specifically in this case, the grating 32a will have a function of small angle diffraction.

According to a particularly advantageous embodiment, the layer 35 is made of monocrystalline silicon. The portion 36 can then form a silicon membrane which forms a periodic grating of atoms.

Thus, the support 30 comprises a grating 32b, in this example an fCC grating formed of silicon atoms, in addition to the grating 32a formed by the structuring of the layer 35. The support 30 thus comprises two gratings 32a, 32b superimposed on the axis of propagation z of light.

This structure thus allows to obtain very good resolution, in particular for the critical dimensions of small sizes, thanks to the grating 32b formed by the atoms of the layer, and another grating 32a which allows to control the position of the object to be analysed.

Naturally, this embodiment is applicable to any material other than silicon and which would allow to structure the surface of the layer 35, and optionally to produce a periodic grating of atoms in its thickness.

According to another embodiment, the grating 32a can also be placed on a silicon membrane. For example, it may be a silica (silicon oxide) grating produced by electronic lithography (Ebeam) on a Fox® or HSQ hydrogen silsesquioxane resin, a sol gel silica which is transformed into silica after exposure to an electron beam by electronic lithography Ebeam, development and annealing.

In the examples illustrated above, the detection device includes a single support 30. The support 30 optionally includes several superimposed diffraction gratings. However, these diffraction gratings are in contact with each other or at least they do not allow the passage of particles between the different gratings.

The paragraphs below describe an embodiment with several supports each including at least one diffraction grating, so that the diffraction gratings are spaced from each other, so as to allow the passage of particles between two adjacent gratings.

Figure 23:
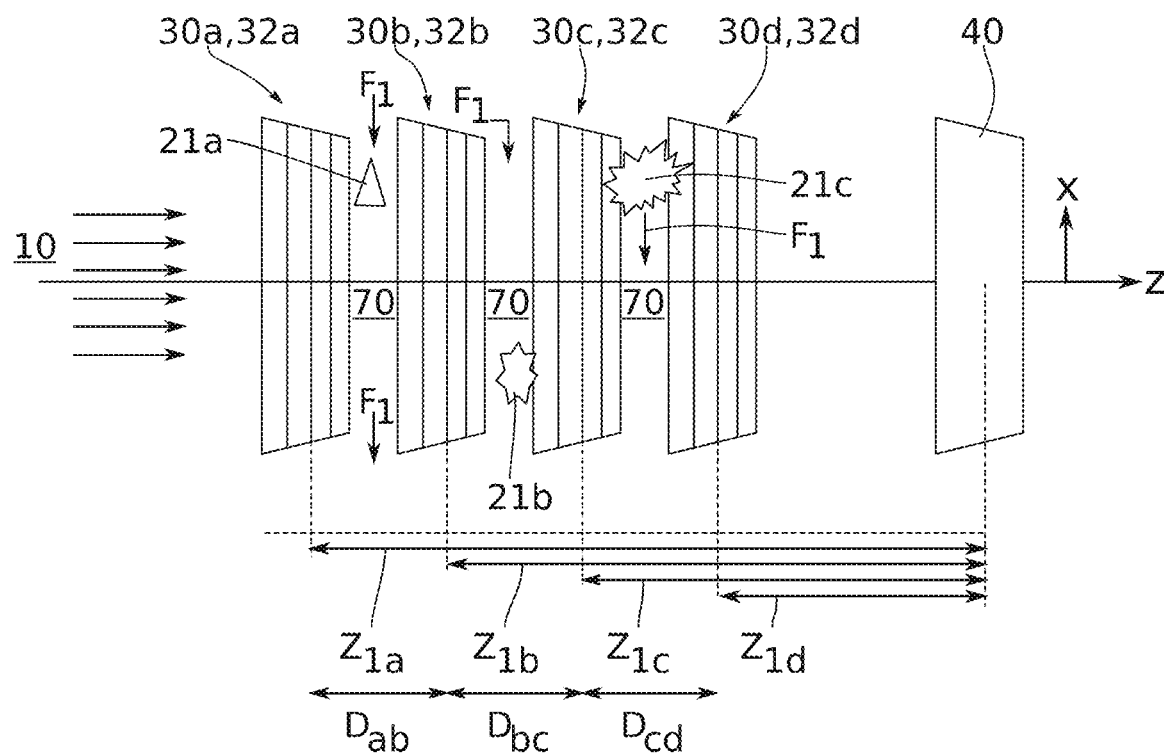
FIG. 23 schematically shows an example of a holographic imaging detection device comprising several diffraction gratings disposed in series.

As illustrated in FIG. 23, provision can be made for several supports 30a-30d including diffraction gratings 32a-32d to be disposed along the axis of propagation of the rays. In the illustrated embodiment, of the line transmission type, these different supports 30a-30d, and therefore their gratings 32a-32d, are aligned along the axis of propagation z. Thus, each grating is at a distance Z1 from the image sensor 40. In the non-limiting example illustrated in FIG. 23, the detection device includes four supports 30a-30d, respectively located at distances Z1a, Z1b, Z1c and Z1d from the image sensor 40.

These different supports 30a-30d are spaced from each other. The distances Dab, Dbc and Dcd are measured along the axis of propagation z and are illustrated in FIG. 23.

Moreover, the detection device is configured so that two gratings channel a detection volume which may comprise particles. Thus, adjacent gratings 32 define therebetween a portion of the detection volume forming a channel 70. The detection device thus has several channels 70. This is particularly advantageous when a flow of fluid transporting particles is channelled through these various channels 70. The arrows F1 illustrate the direction of flow of the fluid transporting the particles 21a-21d.

The presence of this plurality of gratings 32a-32d is thus particularly advantageous, since for a large detection volume, each particle 21a-21c is located in close proximity to one of the gratings. The distance Z2 between each particle and one of the gratings 32a-32d is thus smaller. It can therefore be approximated more easily.

The digital reconstruction of the image can then be carried out by varying the distance Z1 taken into account in the calculation. This allows to restore the particles in position and in morphology.

It will be noted that all the features, technical effects and advantages mentioned in correspondence with embodiments comprising a single diffraction grating are perfectly applicable and combinable with embodiments comprising several diffraction gratings in series.

Naturally, this embodiment with several diffraction gratings can have at least two diffraction gratings, three diffraction gratings, or even four or more diffraction gratings.

Moreover, this embodiment with several supports each including at least one diffraction grating is not limiting on one type of diffraction grating and any periodic structure can be considered. For example, provision can be made for each support to have several superimposed, juxtaposed or interlaced diffraction gratings. Diffraction gratings of the same support do not allow particles to pass therebetween. On the other hand, the particles can pass between the diffraction gratings belonging to two adjacent supports.

In view of the above description, it clearly appears that the proposed device offers a particularly effective solution for improving the counting, identification and analysis of objects of micrometric sizes but also of objects of nanometric sizes.

The invention is not limited to the previously described embodiments and extends to all embodiments covered by the claims.

The invention claimed is:

1. A device for detecting at least one object, the device including:
    a light source configured to emit incident waves at a wavelength $\lambda$,
    a detection volume intended to receive the object, and to receive the incident waves,
    an image sensor positioned to receive at least scattered waves obtained by scattering incident waves on the object and reference waves corresponding to incident waves not scattered on the object, the sensor being configured to generate a holographic image based at least on the scattered waves and on the reference waves,
    a computer data processing device configured to digitally reconstruct the object based at least on the holographic image and the wavelength $\lambda$,
    wherein the device further comprises at least one support comprising patterns organized to form at least one periodic diffraction grating having a pitch P, such that $\lambda/2 \leq P \leq 2\lambda$, such that the scattered waves collected by the sensor comprise:
    waves from the source which were scattered by the object without being diffracted by the at least one diffraction grating, and
    waves from the source which were both diffracted by the at least one diffraction grating and both scattered by the object.

2. The device according to claim 1, wherein the computer data processing device is configured to digitally reconstruct the object based at least on the holographic image, the wavelength $\lambda$, and a distance Z1 between the support and the image sensor, the distance Z1 being taken along an axis of propagation z of the incident wave.

3. The device according to claim 1, wherein the source, the support and the image sensor are aligned, in a direction of propagation (z) of the incident wave.

4. The device according to claim 1, wherein the grating has a pitch P comprised between $0.75*\lambda$ and $1.5*\lambda$.

5. The device according to claim 1, wherein the grating has a pitch P equal to $\lambda$.

6. The device according to claim 1, wherein the grating is a grating of parallel straight lines.

7. The device according to claim 1, wherein the grating is a two-dimensional grating, according to a first dimension of the grating the grating has a pitch Pa and according to a second dimension of the grating, taken in a plane perpendicular to the first dimension, the grating has a pitch Pb, with Pa and Pb such that $\lambda/2 \leq Pa \leq 2\lambda$ and $\lambda/2 \leq Pb \leq 2\lambda$.

8. The device according to claim 7, wherein Pa=Pb, and the two-dimensional grating comprises or is formed of point patterns, the distance between two point patterns corresponding to the pitch P=Pa=Pb of the grating.

9. The device according to claim 1, wherein the support comprises patterns organized so as to form at least two periodic diffraction gratings, among which a first grating having a pitch Pa, and a second grating having a pitch Pb, with Pa and Pb such that Pa≠Pb, $\lambda/2 \leq Pa \leq 2\lambda$ and $\lambda/2 \leq Pb \leq 2\lambda$.

10. The device according to claim 9, wherein the light source is configured to emit at least a first incident wave and a second incident wave, respectively having a wavelength $\lambda a$ and $\lambda b$, such that $\lambda a/2 \leq Pa \leq 2\lambda a$ and $\lambda b/2 \leq Pb \leq 2\lambda b$.

11. The device according to claim 9, wherein the at least two gratings are located on distinct areas of the support.

12. The device according to claim 9, wherein the at least two gratings are at least partly superimposed in projection on a plane perpendicular to said direction of propagation z.

13. The device according to claim 9, wherein the at least two gratings are at least interlaced.

14. The device according to claim 1, wherein the at least one grating occupies on the support an area having, at the wavelength $\lambda$, a transmission coefficient T such that $T \geq 0.5$.

15. The device according to claim 1, wherein the patterns of the grating are made of a dielectric material.

16. The device according to claim 1, wherein the patterns of the grating are made of a material having a heat conduction coefficient greater than or equal to 5 W·m$^{-1}$·K$^{-1}$, the patterns of the grating being made of a metallic.

17. The device according to claim 16, wherein the patterns of the grating form heating elements when power is supplied.

18. The device according to claim 1, wherein the grating comprises, or is only formed by, at least one crystal lattice, the patterns of the grating being formed, at least in part, by atoms of the crystal lattice.

19. The device according to claim 18, wherein the support comprises a layer having a face structured so as to form a first grating of relief patterns and a second grating formed by said crystal lattice.

20. The device according to claim 1, wherein the source emits the incident wave in an axis of propagation z, the sensor has a plurality of photodetectors extending in a plane $P_0$ perpendicular to the axis of propagation z and the support has a main face extending in a plane $P_{30}$ parallel to the plane $P_0$ and perpendicular to the axis of propagation z.

21. The device according to claim 1, wherein the object has a critical dimension CD less than or equal to $\lambda$.

22. The device according to claim 1, wherein the object has a critical dimension CD, such that CD≥2*$\lambda$.

23. The device according to claim 1, wherein the support comprises apertures located between the patterns.

24. The device according to claim 1, comprising a plurality of supports disposed in series, spaced from each other along an axis of propagation z and each comprising at least one diffraction grating, so that the at least one object present in the detection volume is located between the gratings of two adjacent supports.

25. A system comprising at least one device according to claim 1, wherein the system is taken from:
- a fire alarm system,
- a fire detection system,
- a system for analysing the quality of a fluid such as air or water,
- an anti-pollution alarm system,
- a system for detecting powder of explosives,
- a system for detecting microbiological species,
- a DNA analysis system,
- a pollen analysis system, or
- a mold analysis system.

* * * * *